(12) United States Patent
Russell

(10) Patent No.: US 6,687,704 B1
(45) Date of Patent: Feb. 3, 2004

(54) DATABASE MODEL SYSTEM AND METHOD

(75) Inventor: Norman Robert Russell, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 09/655,779

(22) Filed: Sep. 6, 2000

Related U.S. Application Data
(60) Provisional application No. 60/229,608, filed on Aug. 31, 2000.

(51) Int. Cl.$^7$ ............................................... G06F 17/30
(52) U.S. Cl. .................... 707/100; 707/102; 707/104.1; 717/104
(58) Field of Search ................................ 707/100–102, 707/2, 104.1, 4; 717/104, 168

(56) References Cited

U.S. PATENT DOCUMENTS

| | | | | |
|---|---|---|---|---|
| 5,615,367 A | | 3/1997 | Bennett et al. | |
| 5,734,887 A | * | 3/1998 | Kingberg et al. | 707/100 |
| 5,832,498 A | | 11/1998 | Exertier | |
| 5,974,407 A | | 10/1999 | Sacks | |
| 6,112,209 A | * | 8/2000 | Gusack | 707/100 |
| 6,192,371 B1 | | 2/2001 | Schultz | |
| 6,252,956 B1 | * | 6/2001 | Karino | 707/101 |
| 6,263,341 B1 | * | 7/2001 | Smiley | 707/102 |
| 6,324,541 B1 | * | 11/2001 | de l'Etraz et al. | 707/100 |
| 6,366,917 B1 | * | 4/2002 | St. John Herbert, III | 707/100 |
| 6,480,857 B1 | * | 11/2002 | Chandler | 707/100 |
| 6,493,699 B2 | * | 12/2002 | Colby et al. | 707/2 |
| 6,493,717 B1 | * | 12/2002 | Junkin | 707/102 |

FOREIGN PATENT DOCUMENTS

| | | | |
|---|---|---|---|
| EP | 0583108 A2 | 2/1994 | |

OTHER PUBLICATIONS

David Hay Titled "Data Model Patterns : Conventions of Thought" copyright 1996 published by Dorset House Publishing, Chapter 4 (pp. 46–67) & 12 (pp. 235–257).*

L. A. Kalinichenko Titled " Integeration of heterogeneous Semistructured Data Models in the Canonical One" Proc. of first all–Russian Conference on Digital Libraries, Sep. 1999.*

F. Saltor, M. Castellanos and M. Garcia–Solaco Titled " Suitability odf data models as canonical models for federated databases" SIGMOD 1991.*

Jeff Sutherland, Matthew Pope and Ken Rugg Titled " The Hybrid Object Relational Architecture—An Integration of object–oriented and relational technology" Copyrigth 1993 ACM 0–39791–568–2/93/0002/0326 pp. 326–333.*

Hay, David C., Data Model Patterns: Convention of Thought, (Dorset House Publishing, New York, NY 1996).

Wen–Hsiang Kevin Lia O and Dennis McLeod, University of Southern California article entitled "Introduction to Databases", dated Oct., 1999, obtained by the Internet www.scf.usc.edu/~csci586/papers/cs586_reading_12.pdf.

(List continued on next page.)

Primary Examiner—Diane D. Mizrahi

(57) ABSTRACT

A database model system and method are provided that permit changes to the data model, such as the addition, deletion, or modification of attributes, through changes to the data rather than to the fundamental data model schema. A method of structuring a database comprises providing a category table, a content table containing content corresponding to categories in the category table, and a category contents table containing a mapping scheme that maps content contained in the content table to categories in the category table. An attributes table containing attributes for an application utilizing the database and an attributes values table containing values corresponding to attributes in the attributes table are also provided.

33 Claims, 21 Drawing Sheets

OTHER PUBLICATIONS

P. Loos, article entitled "Representation of Data Structures Using the Entity Relationship Model and the Transformation in Relational Databases", dated Apr., 1996, obtain by the Internet www.tu–chemnitz.de/wirtschaft/wi2/home/loos/heft_100.pdf.

U. Sommer and P. Zoller, article entitled "WebCon: Design and Modeling of Database Driven Hypertext Applications", proceedings fo the 32nd Hawaii International Conference on System Sciences 1999, obtained by the Internet www.computer.org/proceedings/hicss/0001/00016/00016022.PDF-?SMSESSION= NO.

* cited by examiner

DATABASE MODEL SYSTEM AND METHOD

CROSS-REFERENCE TO RELATED APPLICATION

This application claims the benefit of the filing date of Provisional Application Serial No. 60/229,608, filed on Aug. 31, 2000.

REFERENCE TO COMPUTER PROGRAM LISTING APPENDIX ON COMPACT DISC

Computer Program Listing Appendices A–H are contained on compact disc and are hereby incorporated herein by reference in their entirety. Computer Program Listing Appendix A (created on compact disc on Jul. 7, 2003 and having a size of 1,777,600 bytes) contains technical architecture design definitions and data for implementing a database model system and method in accordance with an embodiment of the present invention as described more completely below. Computer Program Listing Appendices B and D define data elements utilized for implementing the database model system and method of Computer Program Listing Appendix A. Computer Program Listing Appendix B (pages 1–53) was created on compact disc on Jul. 8, 2003 and has a size of 1,550,336 bytes. Computer Program Listing Appendix B (pages 54–105) was created on compact disc on Jul. 8, 2003 and has a size of 1,359,872 bytes. Computer Program Listing Appendix D was created on compact disc on Jul. 8, 2003 and has a size of 1,275,904 bytes. Computer Program Listing Appendix C (created on compact disc on Jul. 7, 2003 and having a size of 763,904 bytes) provides a table and index report and Computer Program Listing Appendix E (created on compact disc on Jul. 8, 2003 and having a size of 346,112) provides a group definition report for implementing the database model system and method of Computer Program Listing Appendix A. Computer Program Listing Appendix F (created on compact disc on Jul. 9, 2003 and having a size of 2,916,352) provides a tools integration guide containing technical and functional descriptions of various tools and practices employed to implement the database model system and method of Computer Program Listing Appendix A. Computer Program Listing Appendix G (created on compact disc on Jul. 9, 2003 and having a size of 624,640) provides a design document for a dynamic HTML template interpreter for delivering content in accordance with the database model system and method of Computer Program Listing Appendix A. Computer Program Listing Appendix H provides listings of computer programs and related data including the software source code for implementing a database model system and method in accordance with the database model system and method of Computer Program Listing Appendix A. Computer Program Listing Appendix H (pages 1–50) was created on compact disc on Jul. 10, 2003 and has a size of 1,296,384 bytes. Computer Program Listing Appendix H (pages 51–100) was created on compact disc on Jul. 10, 2003 and has a size of 1,511,424 bytes. Computer Program Listing Appendix H (pages 101–150) was created on compact disc on Jul. 10, 2003 and has a size of 1,593,344 bytes. Computer Program Listing Appendix H (pages 151–200) was created on compact disc on Jul. 10, 2003 and has a size of 1,411,072 bytes. Computer Program Listing Appendix H (pages 201–250) was created on compact disc on Jul. 10, 2003 and has a size of 1,538,048 bytes. Computer Program Listing Appendix H (pages 251–300) was created on compact disc on Jul. 18, 2003 and has a size of 1,443,840 bytes. Computer Program Listing Appendix H (pages 301–350) was created on compact disc on Jul. 10, 2003 and has a size of 1,343,488 bytes. Computer Program Listing Appendix H (pages 351–400) was created on compact disc on Jul. 11, 2003 and has a size of 1,187,840 bytes. Computer Program Listing Appendix H (pages 401–450) was created on compact disc on Jul. 14, 2003 and has a size of 1,101,824 bytes. Computer Program Listing Appendix H (pages 451–500) was created on compact disc on Jul. 14, 2003 and has a size of 1,249,280 bytes. Computer Program Listing Appendix H (pages 501–550) was created on compact disc on Jul. 14, 2003 and has a size of 1,249,280 bytes. Computer Program Listing Appendix H (pages 551–600) was created on compact disc on Jul. 14, 2003 and has a size of 1,210,368 bytes. Computer Program Listing Appendix H (pages 601–630) was created on compact disc on Jul. 15, 2003 and has a size of 651,264 bytes.

BACKGROUND OF THE INVENTION

1. Field of the Invention

The present invention relates generally to computer systems and, more particularly, to data modeling.

2. Related Art

Data models describe the organization of a database, which is generally a set of related files that are created and managed by a database management system. The database is typically part of a computer system that stores a large quantity of data organized in a manner that facilitates efficient storage, search, and retrieval. For example, businesses tend to store and require access to large quantities of data relating to specific business matters such as pertaining to employees, customers, inventory, and finances.

A relational database is a common type of database model. The relational database organizes the data in tables comprised of rows and columns, with each data element indexed by its particular row and column. Each row represents an entity, which is a thing of significance about which the organization wishes to hold information concerning. Each column in the corresponding row defines a characteristic or attribute of that entity, with certain columns possibly being designated as "keys" that uniquely identify each row. Primary keys identify an indexed field that maintains the primary sequence of the file or table to access the row, while foreign keys identify a field in one table that is indexed in another table in order to relate or link the tables.

FIG. 1 illustrates a traditional data model table structure for an employee table 100. Employee table 100 is an exemplary table structure listing various attributes of an employee including identification (ID) such as a number, name, and salary. Employee table 100, for example, could be used to create a relational database employee table, with each row corresponding to a certain employee. In such a case, the first column would correspond to the identification number, the next column would correspond to the name, and the final column would correspond to the salary. Thus, the attributes (i.e., the columns) in an entity table are properties specific to an instance of that entity (i.e., the row).

A drawback of the traditional data model is that it may be difficult to add or change attributes. For example, companies differ from each other in terms such as products, services, scale, operating procedures, and organizational structures. Companies may also change internally due to changes such as restructuring, changing product lines, or ways of doing business. Consequently, all of the attributes may not be known, may not be well defined, or may change frequently over a certain period of time. In a complex, inter-related traditional data model, if an attribute must be changed or a new attribute added to a table, then this value must be added to each one of the related records in the database and the change reflected in the related, corresponding tables. This process is time-consuming and labor intensive and requires database maintenance to change the structure of the database.

As a result, there is a need for a database model that offers a flexible and generic database design.

SUMMARY OF THE INVENTION

The present invention provides a database model system and method which offer a flexible and generic database design. The present invention provides many advantages over traditional database modeling schemes and permits additions, deletions, or modifications of attributes of a table by adding, deleting, or modifying the data in an appropriate row and constructing the desired relationships. Consequently, database modifications require changes to the data rather than to the fundamental table definition and database schema. The database model may be incorporated into a computer system, for example, to deliver web pages to users on a computer network.

In accordance with some embodiments of the present invention, a method of structuring a database comprises providing a data object table having a minimal set of attributes, an attribute table having attributes corresponding to the data object table, and a value table having values corresponding to the attributes.

In accordance with other embodiments of the present invention, a method of structuring a database is provided comprising providing a category table, a content table containing content corresponding to categories in the category table, and a category contents table containing a mapping scheme that maps content contained in the content table to categories in the category table. An attribute table containing attributes for an application utilizing the database and an attribute values table containing values corresponding to attributes in the attribute table are also provided.

In accordance with yet other embodiments of the present invention, a computer system is provided comprising one or more server computers connected through a computer network and one or more computer programs executed by a server computer that manages data stored in a database having a structure in accordance with the embodiments described above.

A more complete understanding of the database model system and method will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 2b is a block diagram illustrating an exemplary data model table structure for FIG. 2a.

FIGS. 4a–4l are a block diagram illustrating a database model for an exemplary Internet publishing architecture, in accordance with some embodiments of the present invention.

DETAILED DESCRIPTION OF THE INVENTION

Figure 2A:
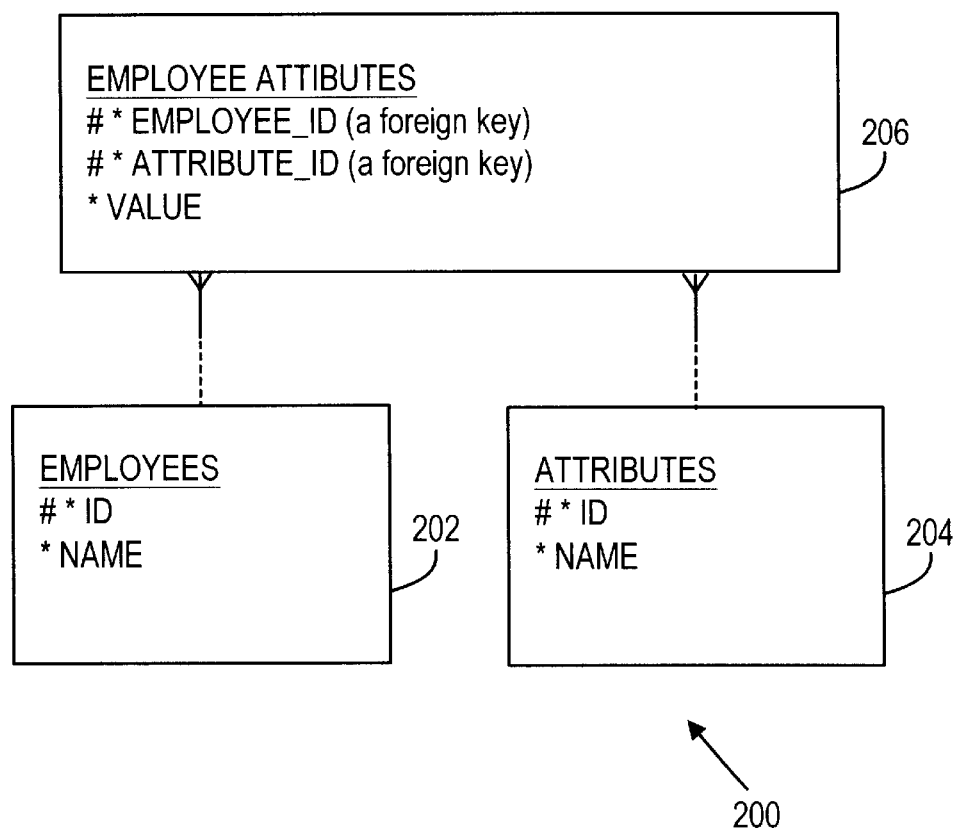
FIG. 2a is a block diagram illustrating an exemplary data model table structure, in accordance with some embodiments of the present invention.

FIG. 2a shows a block diagram illustrating an exemplary data model table structure 200, in accordance with some embodiments of the present invention. Table structure 200 comprises an employees table 202, an attributes table 204, and an employee attributes table 206.

Employees table 202 comprises attributes (i.e., columns) that are always required and are very unlikely to be changed. For example, employees table 202 includes employee identification (ID) and employee name as attributes that will be relatively permanent and remain significant. Employees table 202 may be viewed as an entity table or a data object table. Attributes table 204 comprises rows of properties about employees that may be required or desired. For example, attributes table 204 includes ID and name, with values for attribute "name" being such items as address and phone number. Employee attributes table 206 comprises the values of the specified attributes for a specified employee. Employee attributes table 206, for instance, may store the actual value for the address and phone number of each employee. The foreign keys in employee attributes table 206 determine the attribute for which each value is defined and the corresponding employee.

Various column identifiers or keys may also be employed. For example, the "#" symbol placed next to a column indicates that the column is the primary key for the table. In table structure 200, as an example, employees table 202 has one column, ID, which represents its primary key, while employee attributes table 206 has two columns, EMPLOYEE_ID and ATTRIBUTE_ID, which combine to form its primary key. The primary key may be viewed as an attribute (i.e., a column) or combination of attributes (i.e., columns) that can be utilized to uniquely identify a body of information (i.e., a record). For example, the combination of EMPLOYEE_ID and ATTRIBUTE_ID may be used to uniquely identify every record of information in employee attributes table 206.

Furthermore, the "*" symbol placed next to a column indicates the column is mandatory for every record of information in the specified table. For example, employees table 202 has a "*" symbol associated with columns ID and NAME, because both columns are mandatory for every record in employees table 202. This implies that, for this exemplary table, every employee entered into employees table 202 must have a name and every record must have a primary key associated with it to uniquely identify that record of information. Other column identifiers may also be employed to indicate, for example, columns that are optional.

Figure 1:
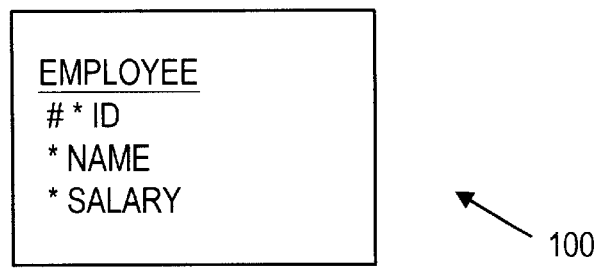
FIG. 1, is a block diagram illustrating a traditional data model table structure.

Table structure 200 is an example of a database architecture in accordance with an embodiment of the present invention. Table structure 200 differs from the traditional data model table structure, as exemplified in employee table 100 and described in reference to FIG. 1, by providing a generic data model for employee information. Table structure 200 in comparison to employee table 100 could be viewed as rotating the entities or tables of the traditional data model on their side and providing attributes and attribute values of an entity in a separate table. The attribute columns in a traditional data model become rows in an attribute table in accordance with some embodiments of the present invention. Consequently, the addition, deletion, or modification of attributes does not require a database schema change. Instead, the addition of an attribute such as salary in table structure 200 only requires adding another row to attributes table 204 with the salary value (associated to a specific employee through a foreign key) contained in employee attributes table 206. This change requires changes to the data rather than to the database structure and table definitions. Thus, it should be understood that the database model system and method of the present invention is generic and applicable to a wide range of database model applications and may employ metadata in the various tables.

Figure 2B:
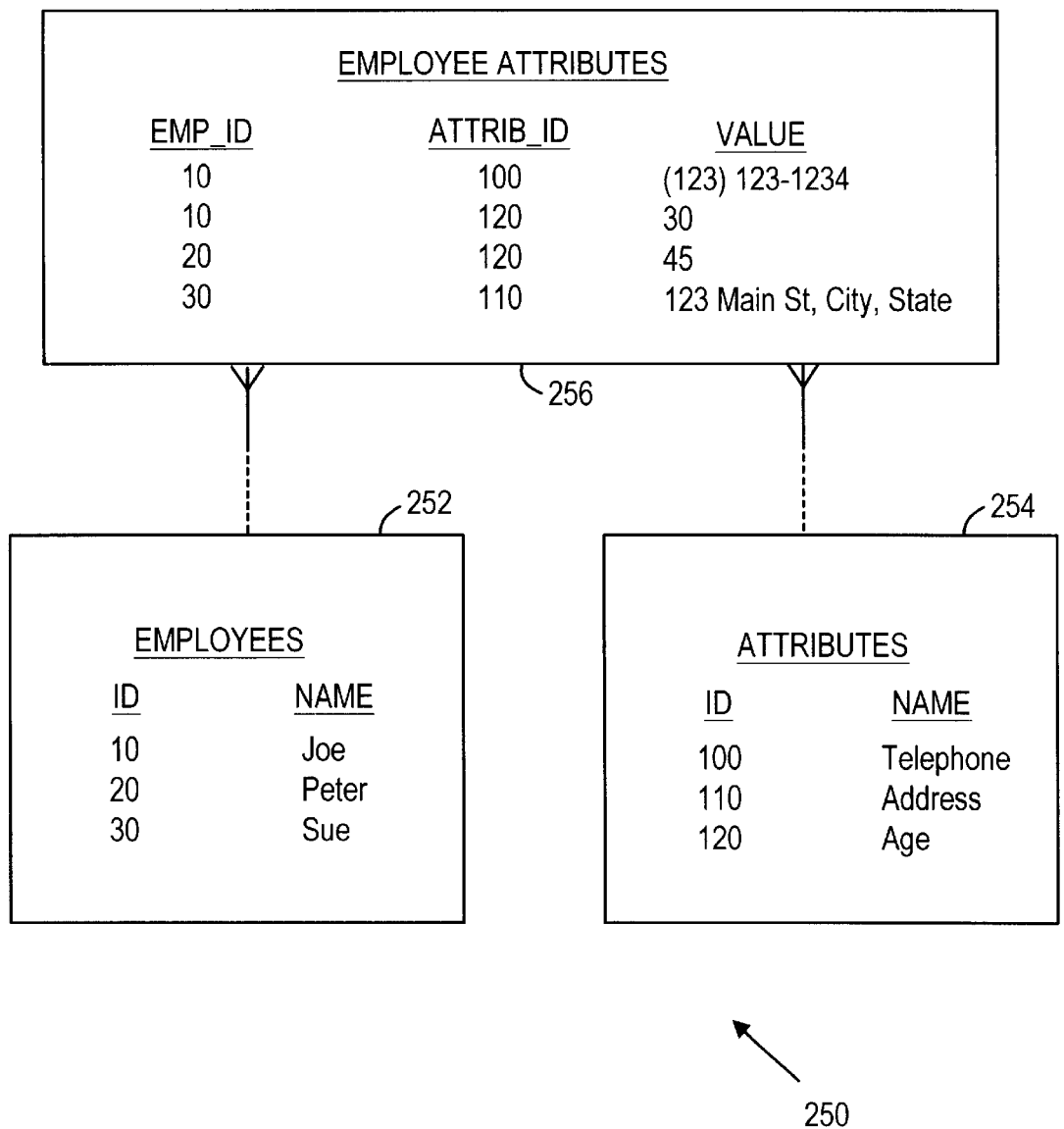

FIG. 2b is a block diagram illustrating an exemplary data model table structure 250 for FIG. 2a. As shown, table structure 250 comprises exemplary data for table structure 200 of FIG. 2a. Table structure 250 comprises employees table 252, attributes table 254, and employee attributes 256. Employees table 252 includes attributes such as, for example, ID and name, with rows corresponding to specific instances of those attributes. For example, the rows may include IDs 10, 20, and 30, corresponding to Names Joe, Peter, and Sue, which are employees. Attributes table 254 includes values for attribute Name such as, for example, telephone, address, and age, with corresponding attribute ID values 100, 110, and 120.

Employee attributes table 256 includes the values of the specified attributes for a specified employee. For example, column headings may include Employee ID (EMP_ID), attribute ID (ATTRIB_ID), and Value, with the rows corresponding to specific instances of these column headings. As an example, Employee ID has rows 10, 10, 20, and 30, attribute ID has rows 100, 120, 120, 110, and Value has rows containing values for a telephone number ((123) 123-1234), age (30), age (45), and address (123 Main St., City, State). As should be understood, for example, the first row identifies Joe (Employee ID of 10, known through Employees table 252) and stores the value of his telephone number, which is identified as a telephone number through Attributes table 254. The same analysis may be performed for the other exemplary rows.

Table structure 250 illustrates the generic nature of the data model, in accordance with some embodiments of the present invention. The addition, deletion, or modification of attributes does not require a database schema change. For example, if data regarding the drivers license for employee Sue (Employee ID 30) needs to be incorporated into table structure 250, no additional columns are required. Instead, attributes table 254 would be modified to include another row (e.g., ID of 140 and Name of Drivers License) and Employee attributes table 256 would be modified to include another row (e.g., Employee ID of 30, Attribute ID of 140, and Value of A123, with A123 being the value of Sue's drivers license number). Thus, many different changes may be made that only require changes to the data rather than to the database structure and table definitions.

Figure 3A:
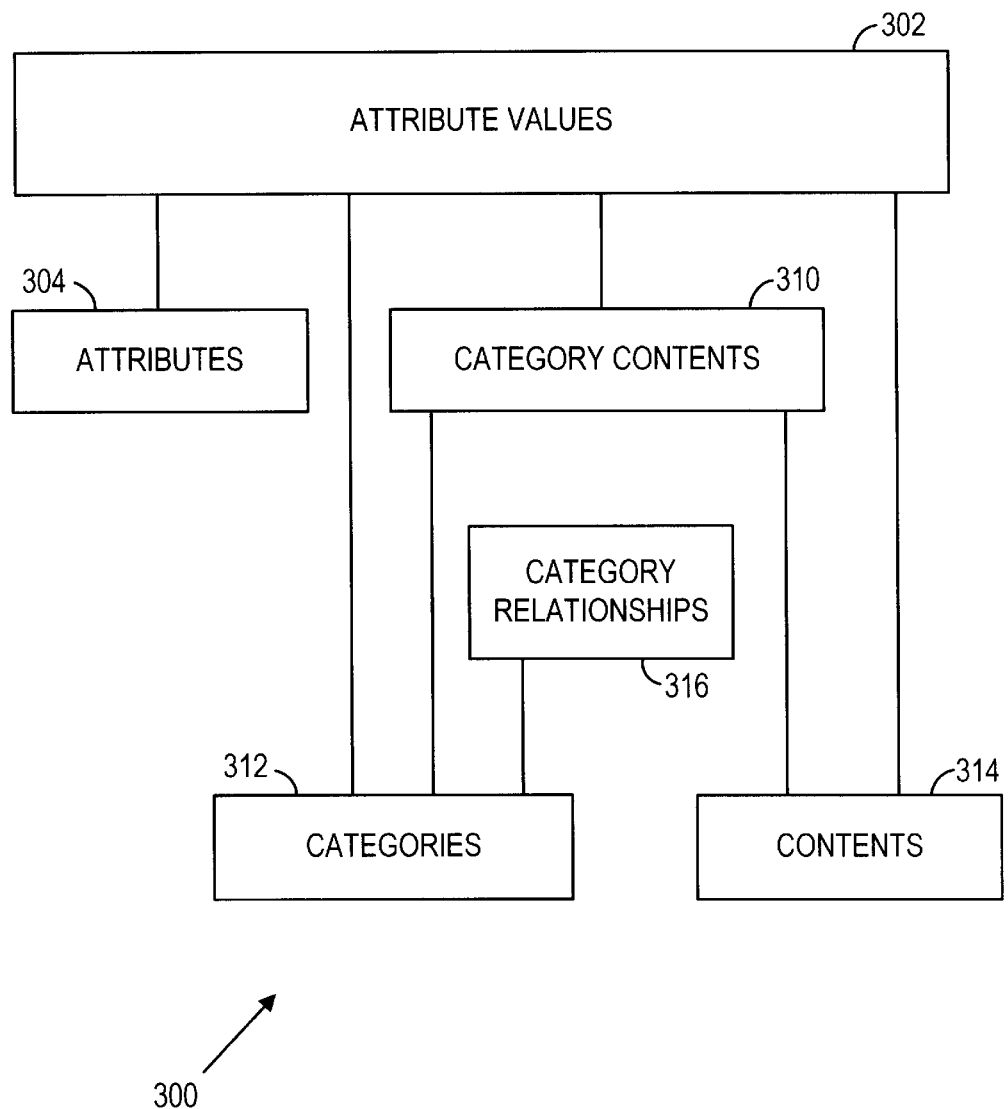
FIG. 3a is a block diagram illustrating an exemplary generic database model table structure, in accordance with some embodiments of the present invention.

FIG. 3a is a block diagram illustrating an exemplary generic database model table structure 300, in accordance with some embodiments of the present invention. Table structure 300 comprises an attribute values table 302, an attributes table 304, a category contents table 310, a categories table 312, a content table 314, and a category relationships table 316. As can be seen from table structure 300, the basic table components of this exemplary generic database model comprise content, categories, and attributes, which are linked together and provide attributes and content for a given entity in separate tables.

Categories table 312 comprises a table of categories for the subject matter of table structure 300. For example, categories may consist of a company's business structure or product line, which may be viewed as structured data. Category relationships table 316 describes how categories relate to each other along with corresponding relationship rules.

Figure 3B:
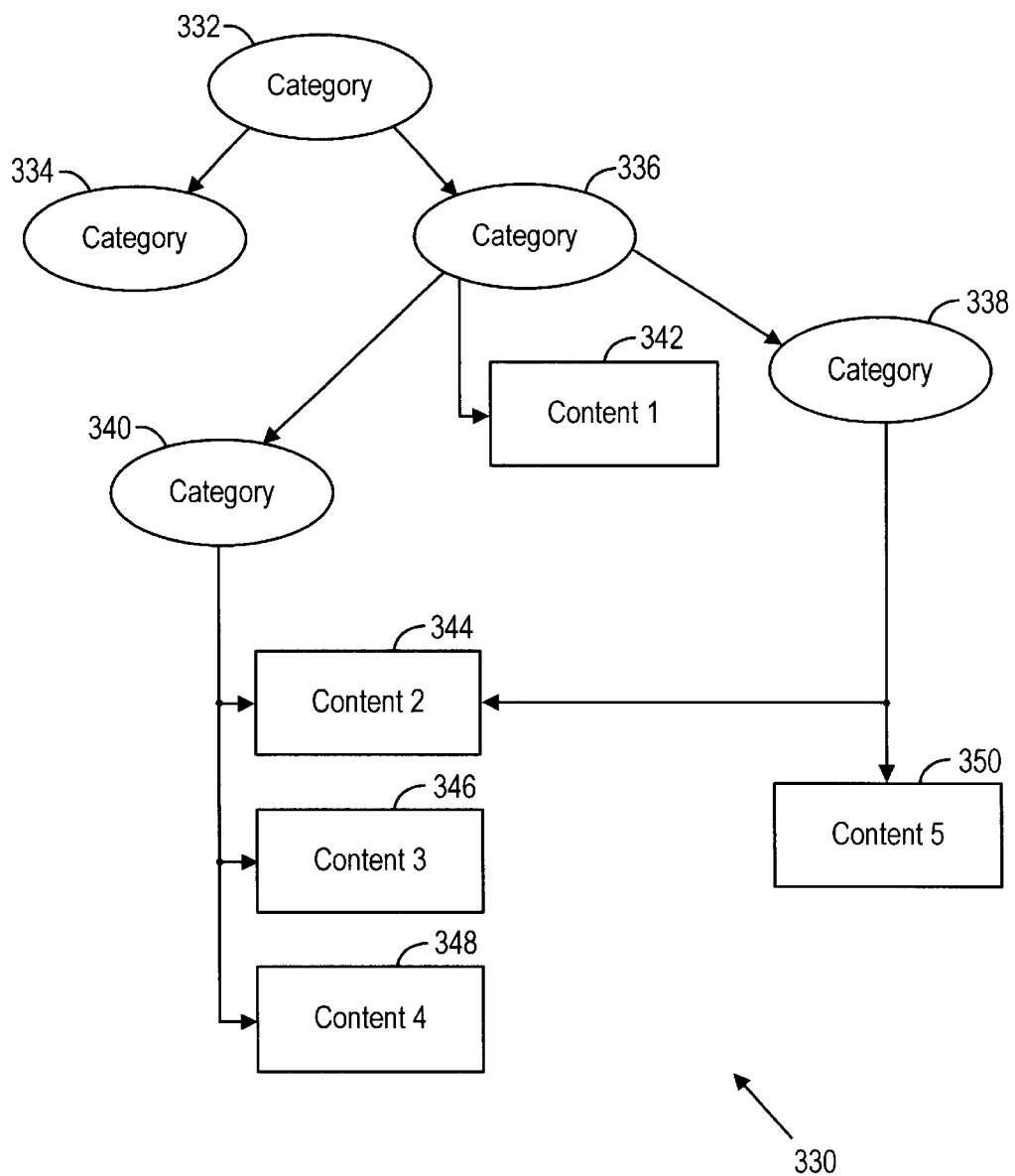
FIG. 3b is a block diagram illustrating an exemplary relationship of category and content, in accordance with some embodiments of the present invention.

Content table 314 contains any content necessary to describe or support a category. For example, such content may include text documents, images, videos, or sounds and include unstructured data. FIG. 3b is a block diagram 330 illustrating an exemplary relationship of category and content, in accordance with some embodiments of the present invention. Block diagram 330 comprises a number of category items 332, 334, 336, 338, and 340 and a number of content items 342, 344, 346, 348, and 350, with the arrows showing the direction and linking of one to the other. For example, category item 332 is linked to category 334 and to category 336. Category 336 is linked to content 1 342, which contains the category content for category 336. As shown, block diagram 330 defines the relationship of category (e.g., structured data) to content (e.g., unstructured data).

Category contents table 310 comprises a mapping scheme that maps a piece of content from content table 314 to its place in the category index corresponding to categories table 312. For example, a document that describes how to ensure a telephone line is properly installed into a facsimile machine may appear in the following product hierarchy position: Facsimile product X—installation and configuration—connecting telephone line.

Figure 3C:
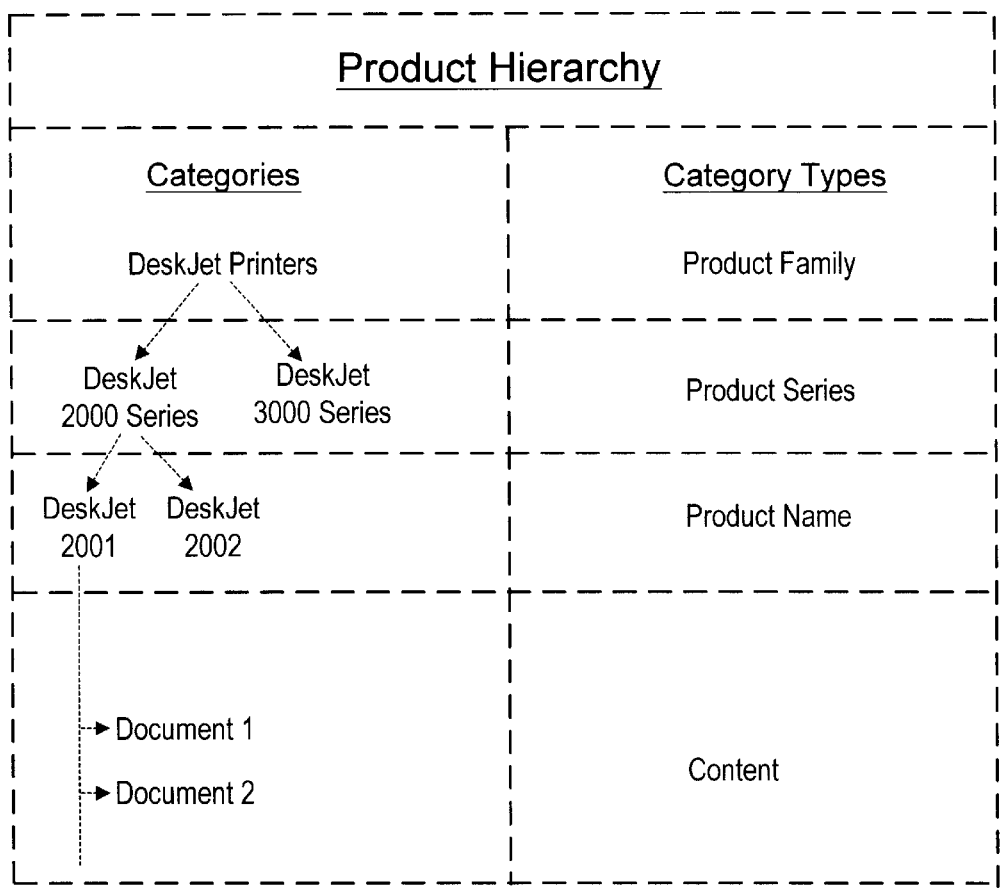
FIG. 3c is a table illustrating a category hierarchy, in accordance with some embodiments of the present invention.
Figure 4A:
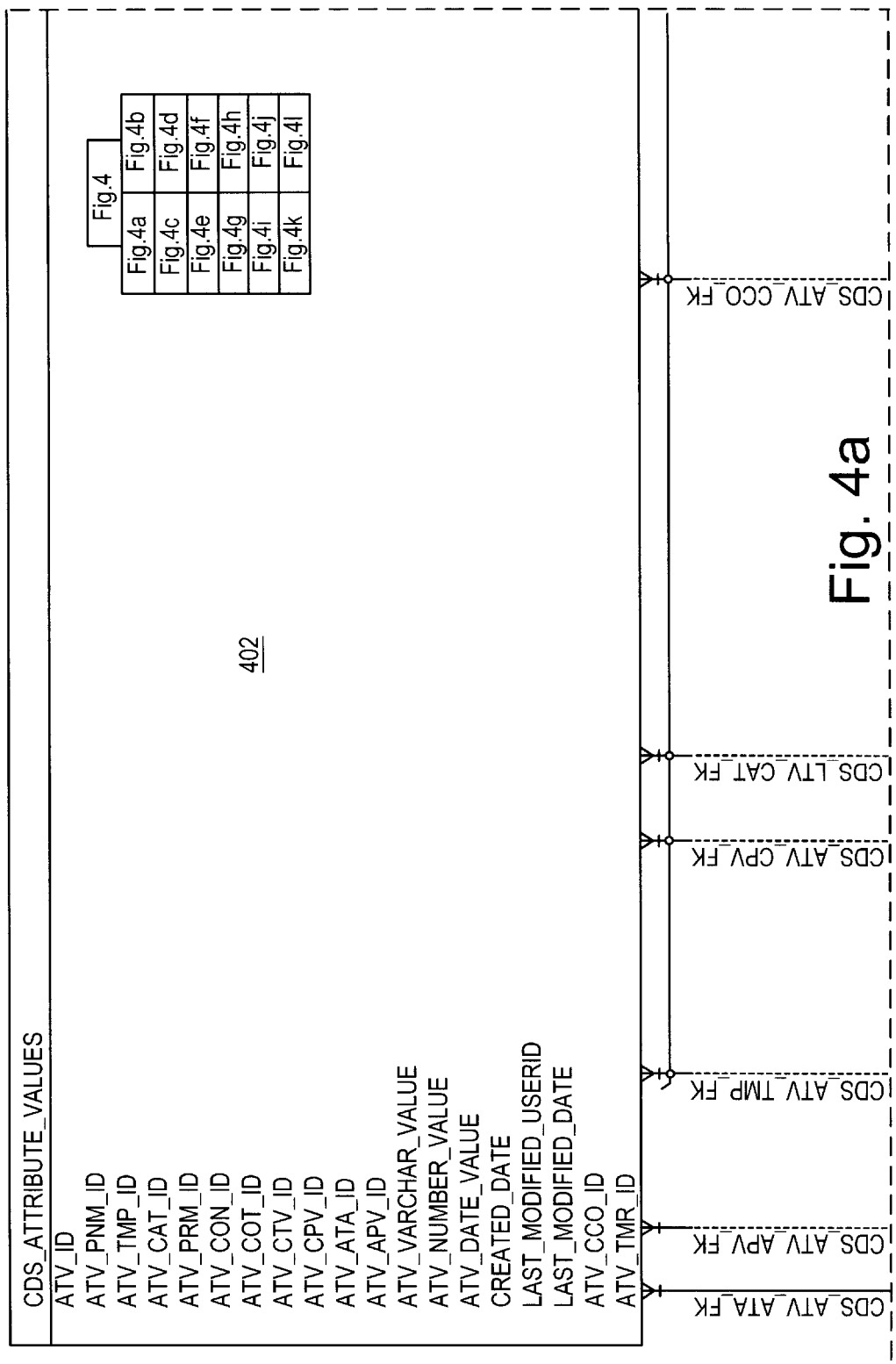
Figure 4B:
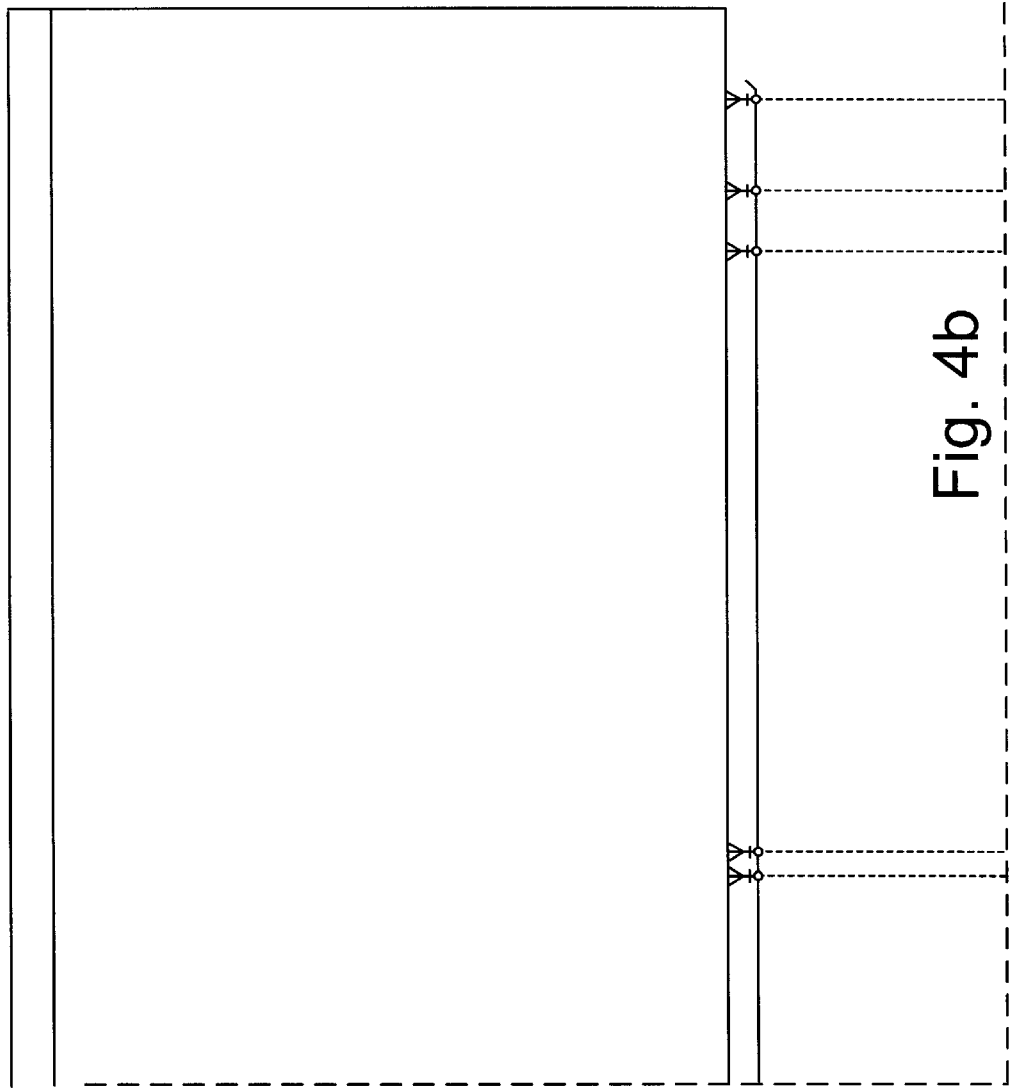
Figure 4C:
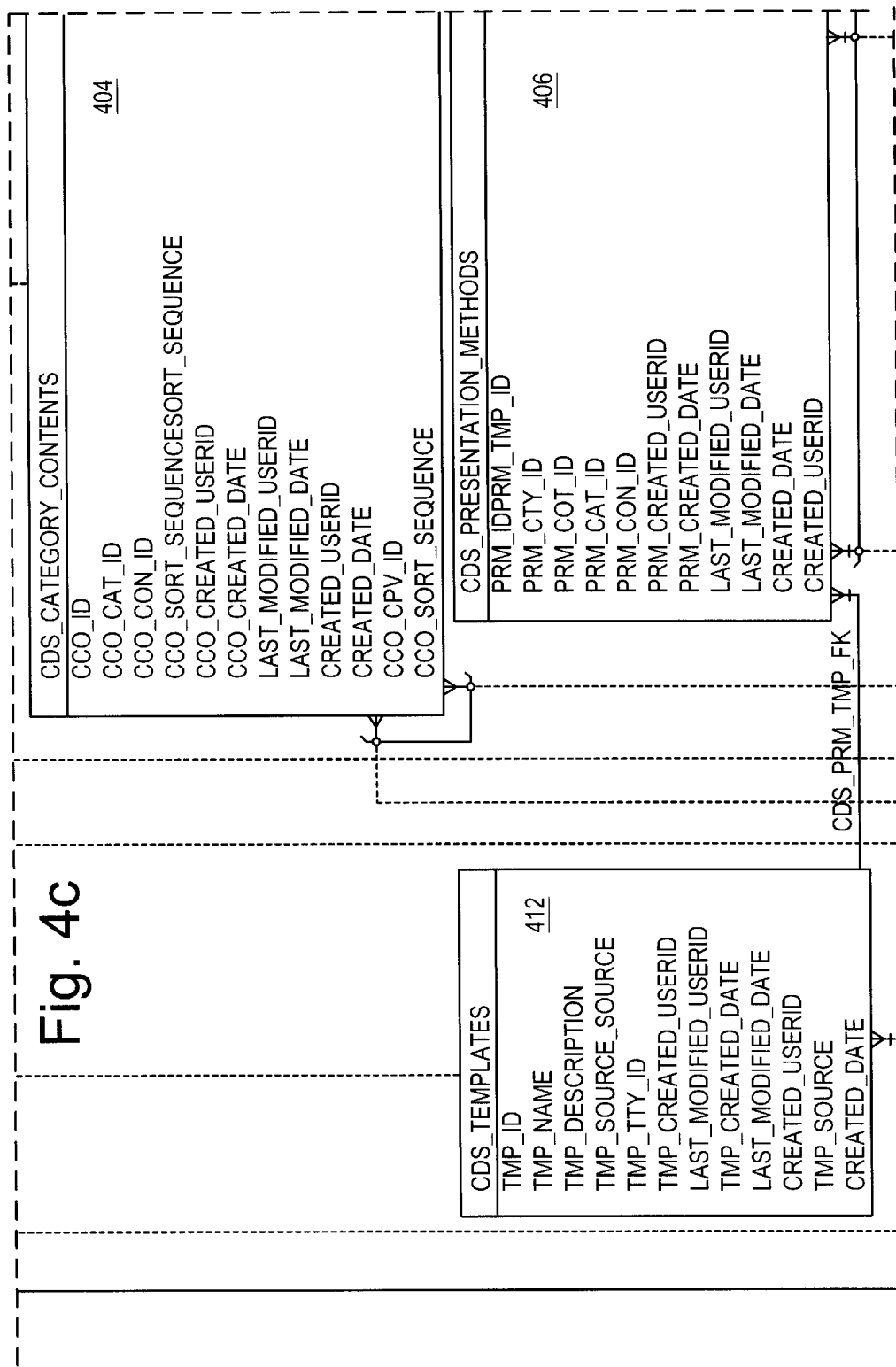
Figure 4D:
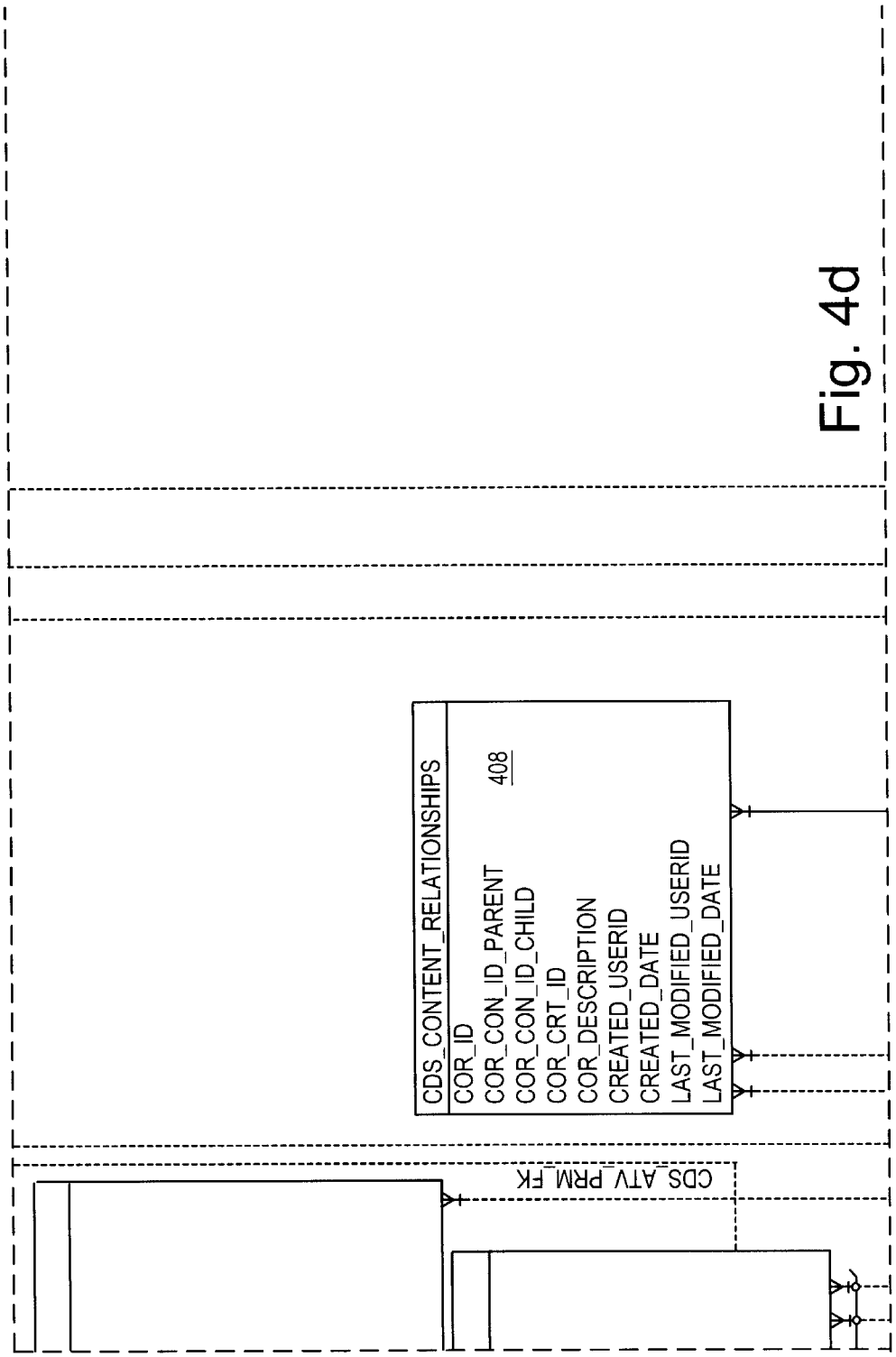
Figure 4E:
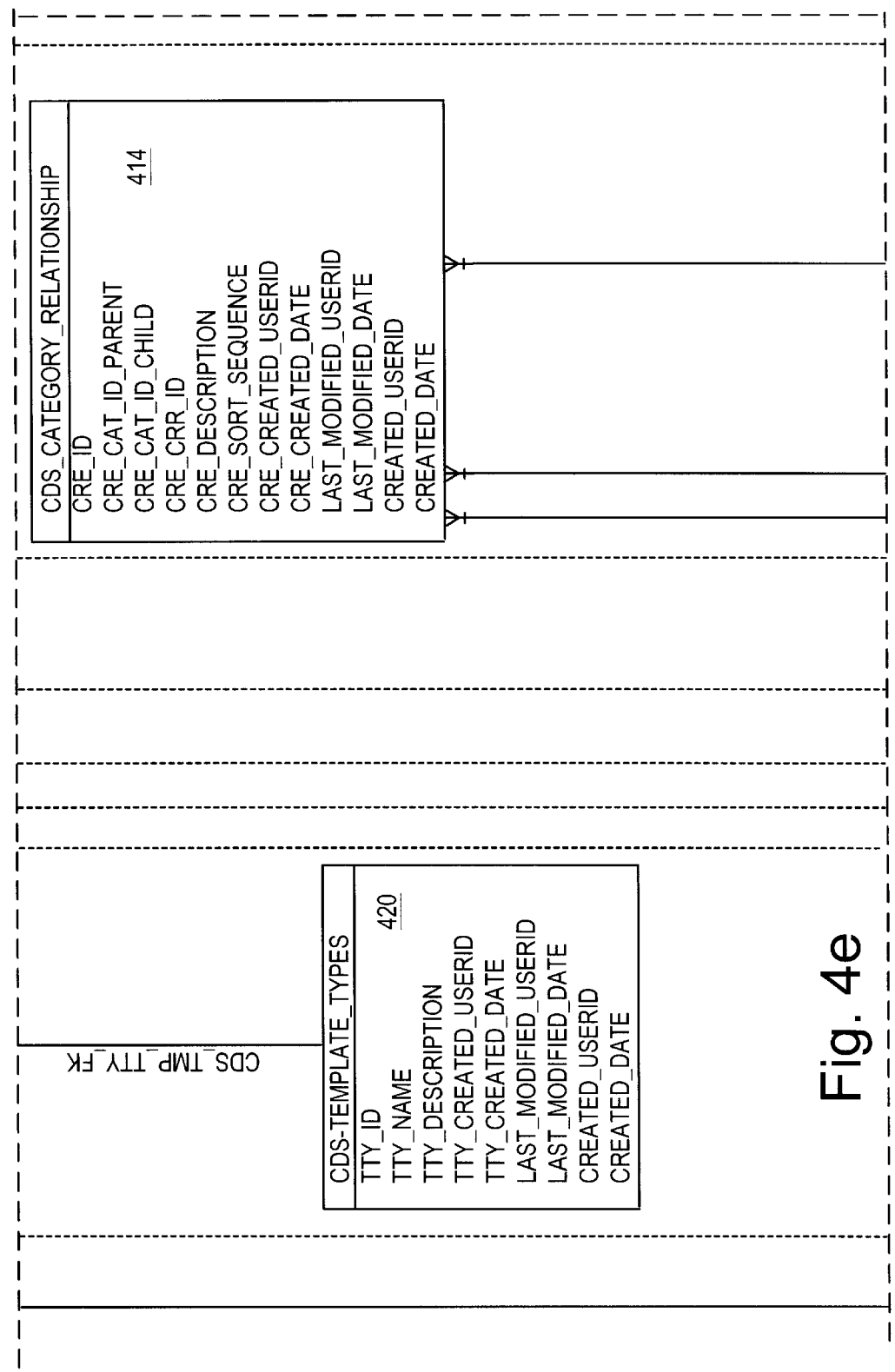
Figure 4F:
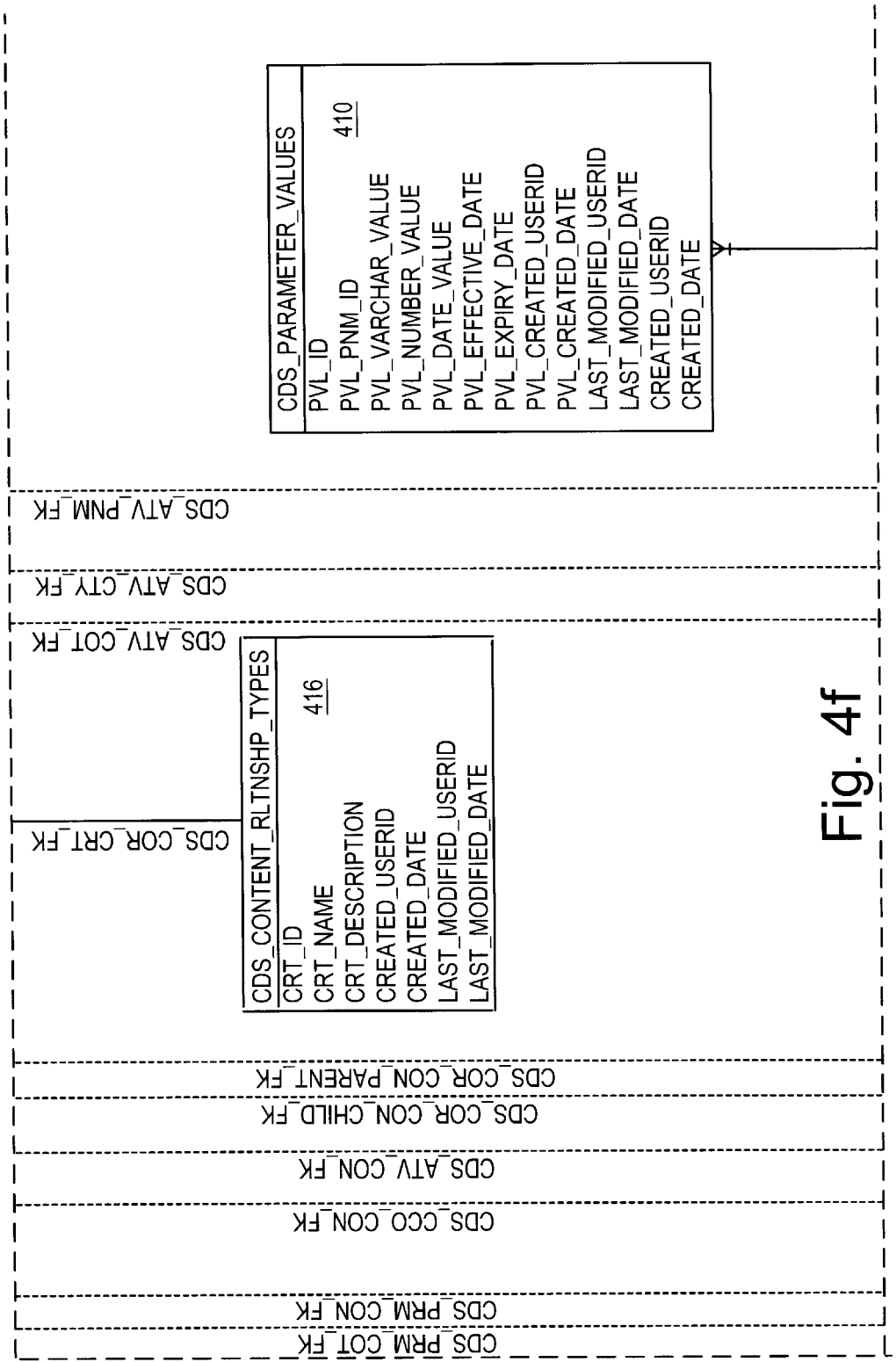
Figure 4G:
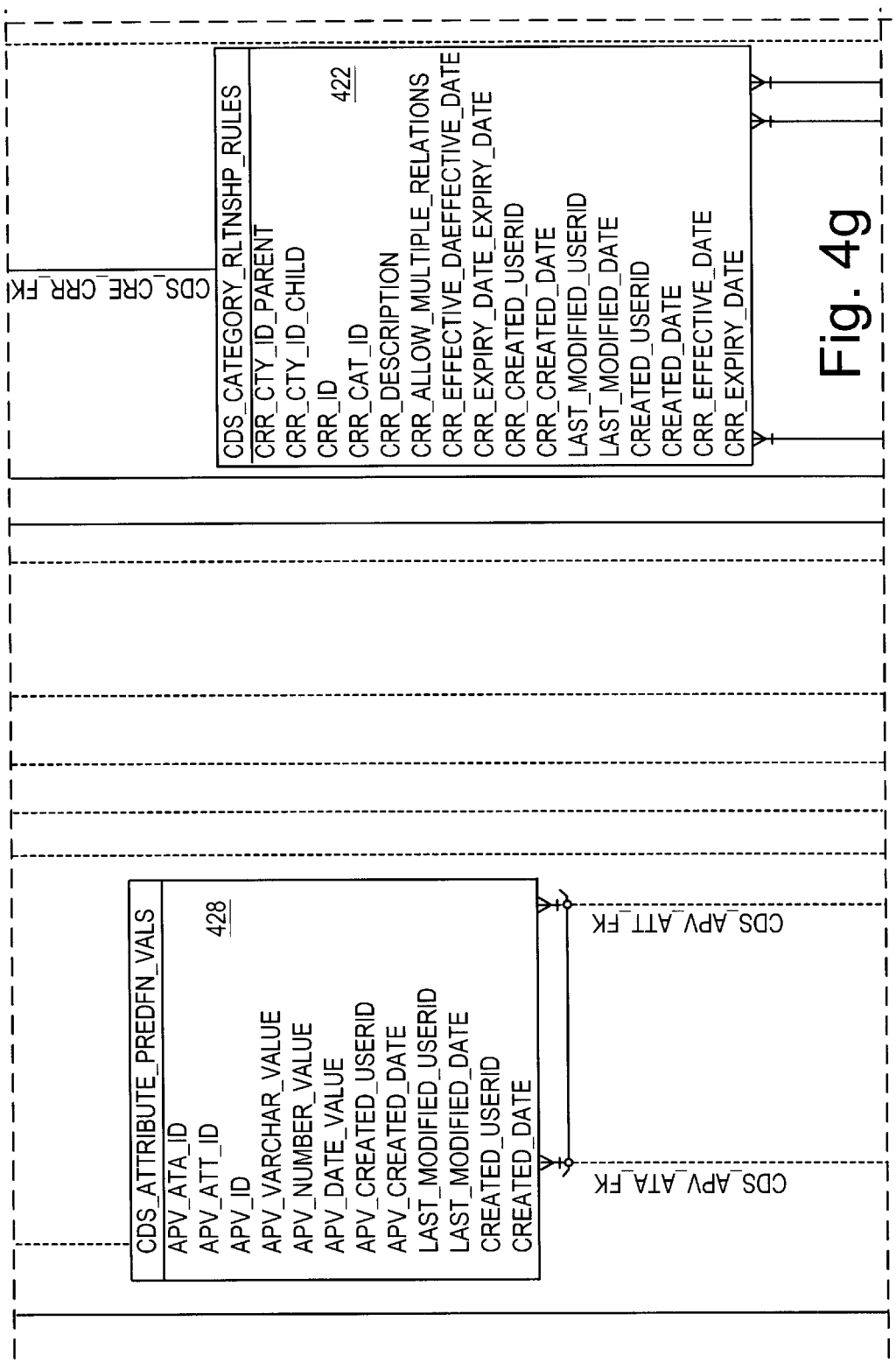
Figure 4H:
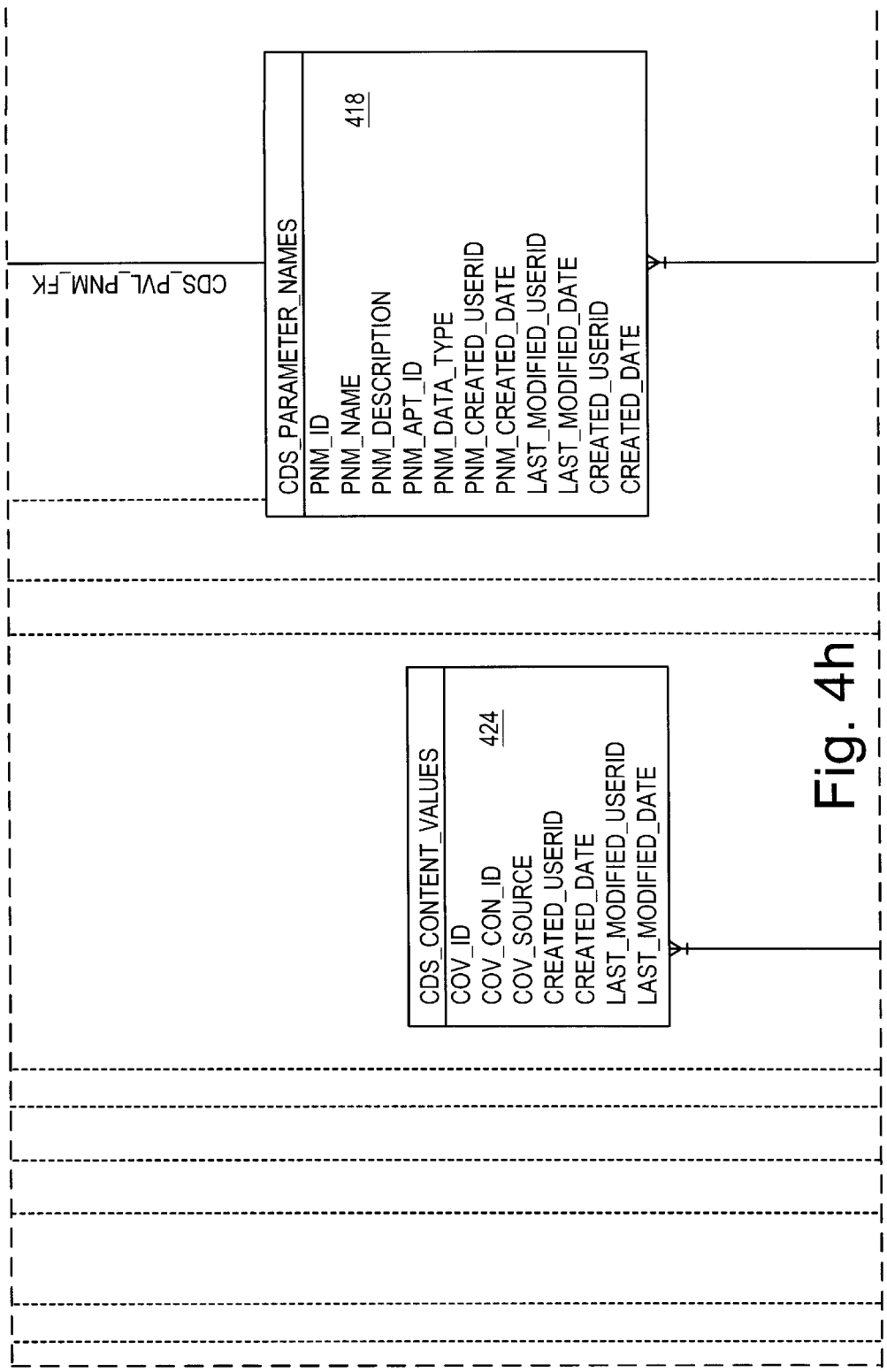
Figure 4I:
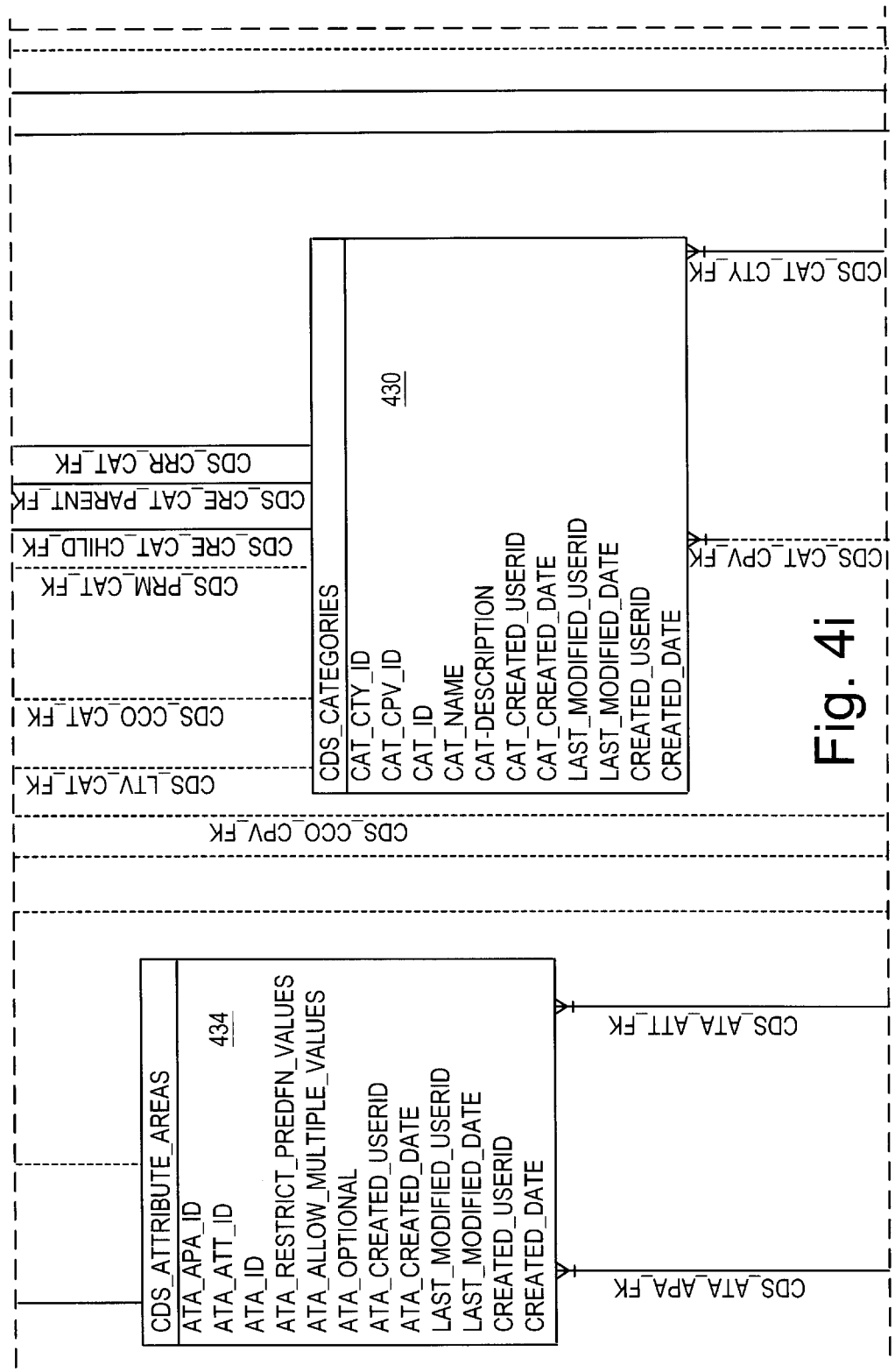
Figure 4J:
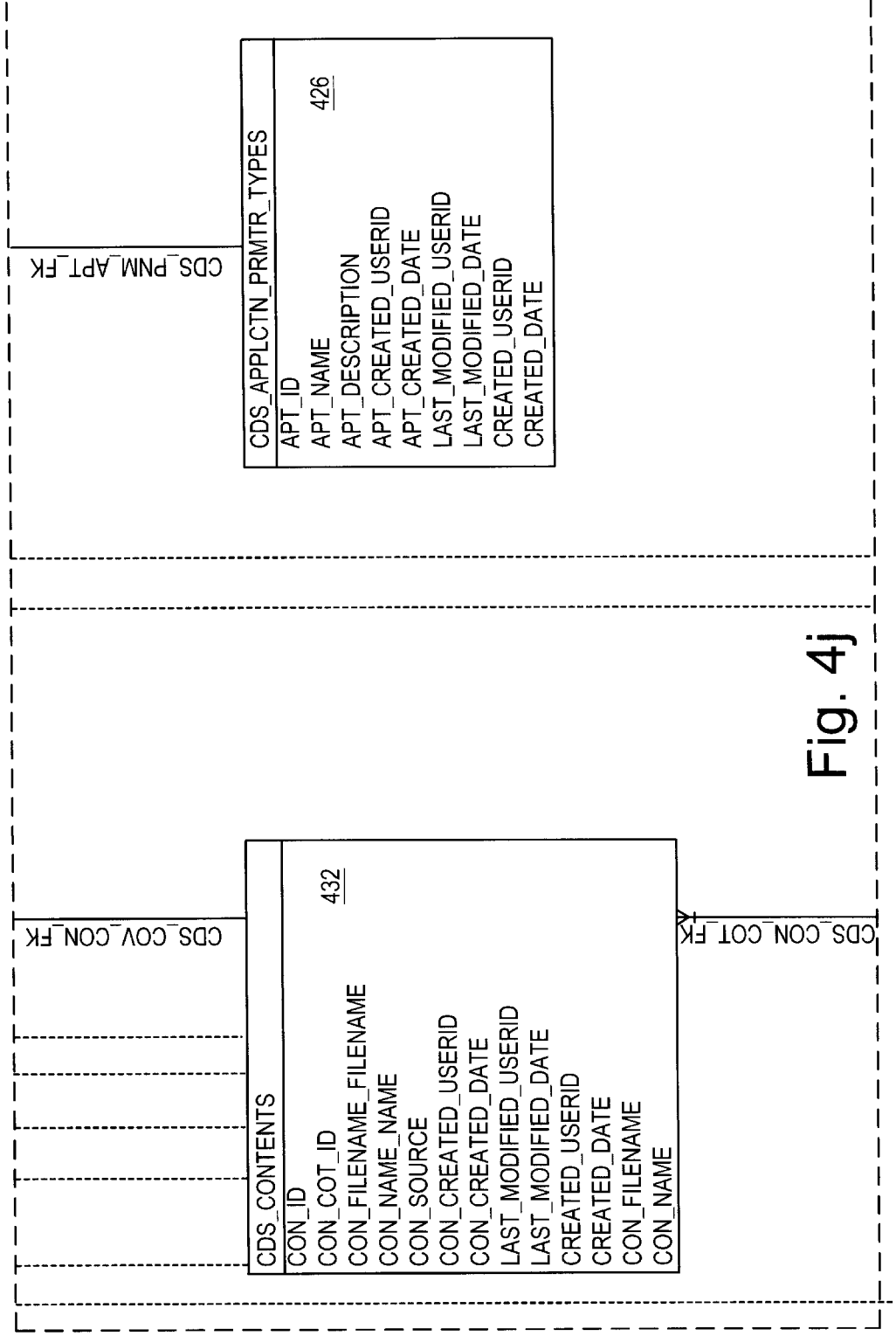
Figure 4K:
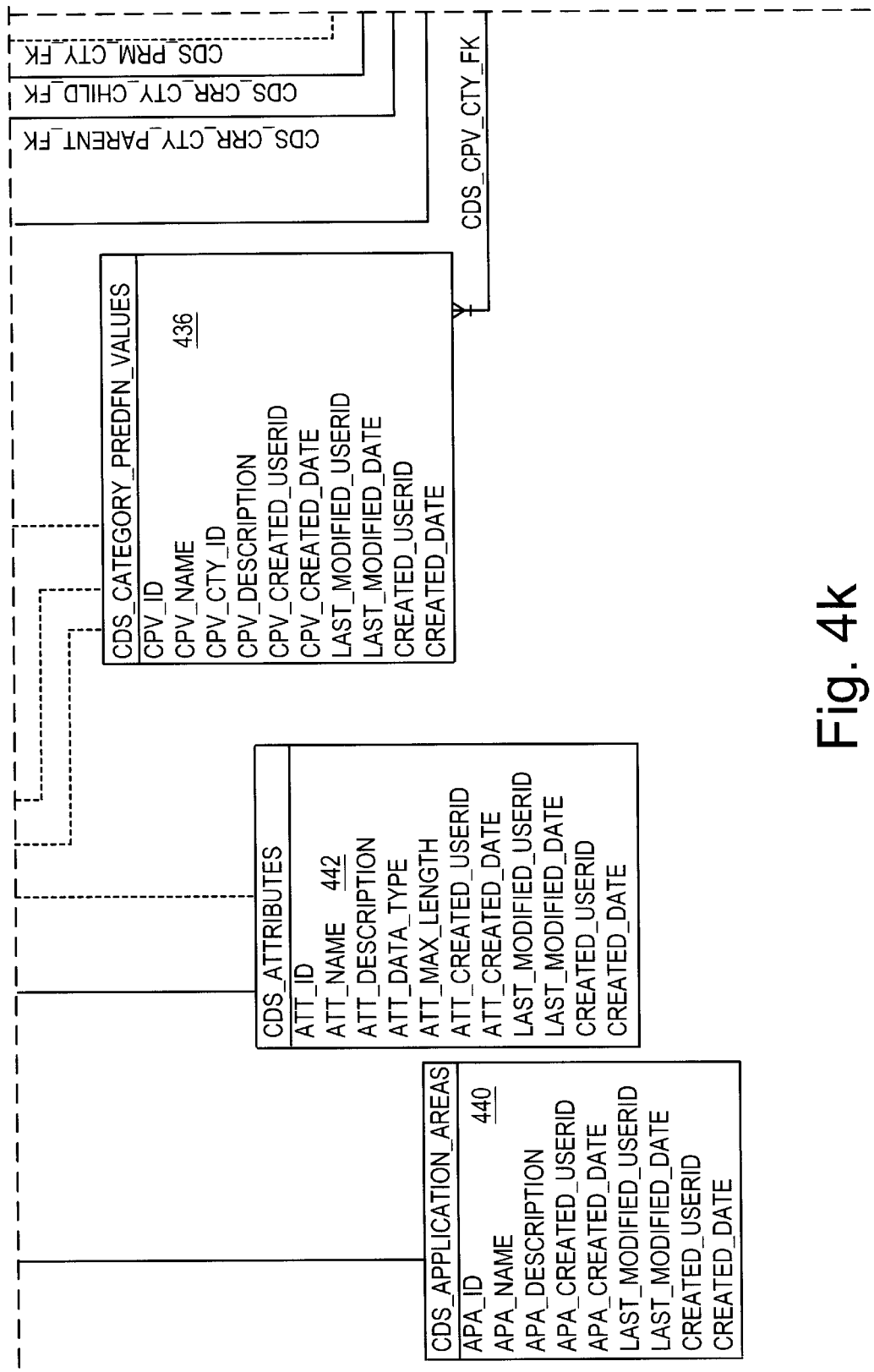
Figure 4I:
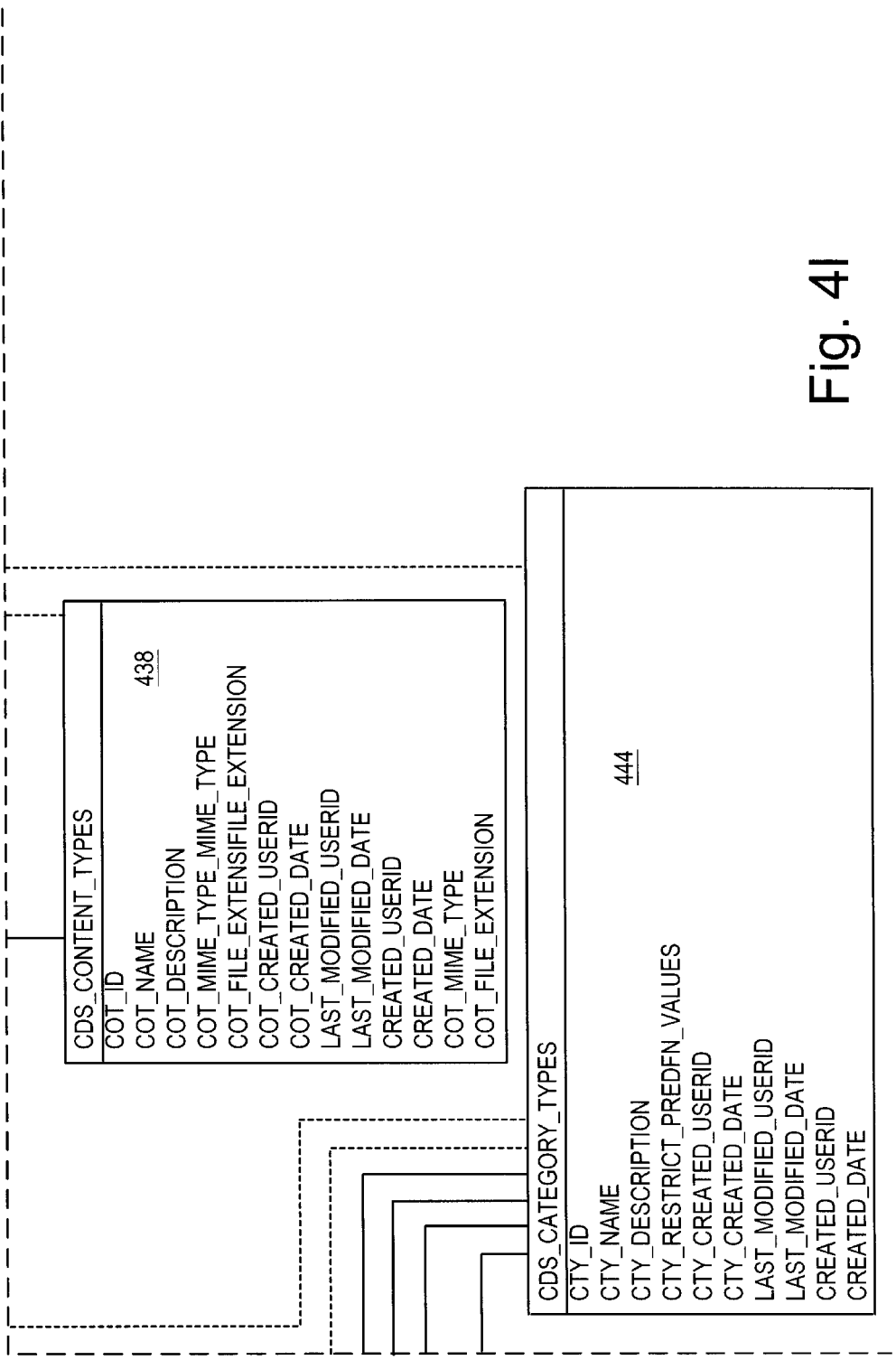

It should be understood that a given hierarchy may have a many-to-many relationship. For example, FIG. 3c is a table 380 illustrating a product hierarchy, in accordance with some embodiments of the present invention. Table 380 illustrates an exemplary category hierarchy (e.g., product hierarchy) that shows how categories may be arranged in a hierarchy. For example, category types may include a product family, product series, product name, and the final content. As an example, for product family there may be many different categories such as printers, copy machines, computers, and facsimile machines. If the printers category (e.g., DeskJet printers) is selected, then a selection may be made from the product series (e.g., 2000 series or 3000 series). The product name for a particular type (e.g., 2001 or 2002) of series printer is selected next, and finally, the particular content (e.g., document 1 or document 2) desired is obtained. This illustrates the hierarchical nature of a many-to-many relationship and the need for mapping content to category.

Referring to FIG. 3a, attributes table 304 describes all attributes defined for a given application utilizing table structure 300. The attributes may be further defined in terms of areas of a given application that may be referenced in table structure 300. For example, certain areas that may be referenced are "content" and "categories." The attributes can also be defined for the areas of the application that are designated. For example, attributes may be access control lists, operating system, or language. The area of a given application utilizing table structure 300 that is allowed to use a certain attribute may also be defined. For example, the attribute language may apply to all areas including content and categories defined by their corresponding tables. Some of these features are explained in further detail in reference to FIG. 4.

Attribute values table 302 is linked to attributes table 304, category contents table 310, categories table 312, and content table 314. Attributes table 304 may be used to identify what attribute belongs to what area of the application. Attribute values table 302 comprises values assigned to an attribute specified through one of the related tables via foreign keys.

In general, a new type of data may be represented as an attribute using attributes table 304 or as a category relating to another category using categories table 312. If more than one piece of information needs to be recorded about the new type of data being added, then a category should be created. For example, a product may have warranty information accessible through a network hypertext link. Associated with the warranty navigation link is a number of warranty documents. Because of the additional information needed for the warranty (i.e., the warranty documents), making an attribute identifying the product as having warranty information is not appropriate. Making warranty a category and relating it to the product would be the preferred choice. On the other hand, if no additional information is needed about the new data that is being added, then an attribute would suffice. For example, a product ID is associated with a product. Because no additional information is necessary concerning the product ID, making it an attribute related to the product is the preferred choice.

It should be understood that table structure 300 illustrates a generic and flexible database model that is an extension of the principles illustrated in exemplary table structure 200 described in detail in reference to FIG. 2a. Table structure 300 provides, for example, categories to be changed and content to be revised simply by making the changes to the appropriate row in categories table 312 and content table 314, respectively. The principles of the present invention permit additions or modifications of attributes of a table simply by adding or modifying the data in an appropriate row and constructing the desired relationships. Consequently, database modifications require changes to the data rather than to the table definition and database schema.

This database model architecture is flexible and extensible and allows for enhancements, changes, and additions to the data stored in the database. This data may include product information, product navigation, support documents, images, video or sound data, or any other items of interest. Furthermore, the principles of the present invention may be applied to any type of data or structure that may be modeled by a data base model, and is not limited to products or other embodiments discussed herein.

FIG. 4 is a block diagram illustrating a database model 400 for an exemplary Internet publishing architecture (IPA) in accordance with some embodiments of the present invention. Database model 400 incorporates the principles of the present invention to provide a content delivery system (CDS) that displays information in the form of, for example, an Internet web page. Database model 400 comprises an attribute values (CDS_ATTRIBUTE_VALUES) table 402, a category contents (CDS_CATEGORY_CONTENTS) table 404, a presentation methods (CDS_PRESENTATION_METHODS) table 406, a content relationships (CDS_CONTENT_RELATIONSHIPS) table 408, a parameter values (CDS_PARAMETER_VALUES) table 410, a templates (CDS_TEMPLATES) table 412, a category relationships (CDS_CATEGORY_RELATIONSHIPS) table 414, a content relationship types (CDS_CONTENT_RLTNSHP_TYPES) table 416, a parameter names (CDS_PARAMETER_NAMES) table 418, a template types (CDS_TEMPLATE_TYPES) table 420, a category relationship rules (CDS_CATEGORY_RLTNSHP_RULES) table 422, a content values (CDS_CONTENT_VALUES) table 424, an application parameter types (CDS_APPLCTN_PRMTR_TYPES) table 426, an attribute pre-defined values (CDS_ATTRIBUTE_PREDFN_VALS) table 428, a categories (CDS_CATEGORIES) table 430, a contents (CDS_CONTENTS) table 432, an attribute areas (CDS_ATTRIBUTE_AREAS) table 434, a category pre-defined values (CDS_CATEGORY_PREDFN_VALUES) table 436, a content types (CDS_CONTENT_TYPES) table 438, an application areas (CDS_APPLICATION_AREAS) table 440, an attributes (CDS_ATTRIBUTES) table 442, and a category types (CDS_CATEGORY_TYPES) table 444.

The various tables of database model 400 are linked using the notation of a solid line meaning mandatory, a dashed line meaning optional, one line branching out meaning one-to-many, many lines joining to one meaning many-to-one, and an arc linking several lines meaning a logical exclusive OR relationship. The links are further labeled based on their origin and destination within database model 400.

The tables shown in the database model 400 list exemplary data such as attributes and keys for each respective table. Various icons indicate columns that correspond to the primary or foreign key along with mandatory or optional data. Computer Program Listing Appendices B and D (on compact disc) provide details and definition for all of the data elements, but a brief description of the tables is provided below.

Category types table 444 describes the type of category such as a generic name or class (e.g., an object class) of a category. For example, category types are product number (e.g., product ID or SKU), product name, product series, product line, product family, and product category. Categories table 430 and category types table 444 are used because not all products follow the same traditional hierarchy of product categorization. This provides flexibility in modeling hierarchies having a different number of hierarchical levels. In more general terms, HP products fit into a network or hierarchical model with categories table 430, category relationships table 414, category types table 444, and category relationship rules table 422 forming this network model.

Categories table 430 contains a physical tangible product list, category of products, or subject area of a product for a company (e.g., Hewlett Packard (HP)). For example, a product family is HP DeskJet printers or HP DeskJet 600 series printers, while a product name is HP DeskJet 694C printer, and a subject area (i.e., a category type) is print or facsimile (i.e., a category). A product, category, and subject categorization is described by its relationship to category types table 444.

Category relationships table 414 describes how two or more product/subject categories are related and the relationship rule of the related product/subject category, with product/subject categories defined by the product hierarchy or, generally, a product network. For example, there may be four product/subject categories described in the product network as shown below.

| ID | Product/Category Name | Category Type |
|----|----------------------|---------------|
| 1  | Personal Computing   | Product Family |
| 2  | HP Vectra PCs        | Product Group |
| 3  | HP Vectra XU 5       | Product Name |
| 4  | D3520A               | Product Number |

Category relationships table 414 would record the fact that ID 4 is related to ID 3, ID 3 is related to ID 2, and ID 2 is related to ID 1(see also description in reference to FIG. 3c. for another exemplary hierarchical relationship).

Category relationships rule table 422 describes the rules for how category types can be related. A rule may be restricted to a previously defined category and define whether the relationship can occur only once or repeatedly for two nodes. For example, product series nodes are related to product name nodes and product name nodes are related to product number nodes. An example where the relationship to category would be useful would be a rule such as product number nodes are related to product name nodes. This relationship is phrased in the opposite direction than the prior example. Thus, there is a many-to-many relationship between product names and product numbers. However, the relationship between product numbers and product names is only applicable to certain products. Thus, to prevent the use of product number related to product name rule, the rule is restricted to a specified category.

Category pre-defined values table 436 describes pre-defined categories, with one or more pre-defined categories permitted for a given category type. For example, for "Help" subject area, which is a specific instance in categories table 430, category there may be pre-defined values of "show me how," "troubleshooting," and "install and configure."

Content types table 438 describes the type of content stored by contents table 432. For example, a text document, an image, and a manual would be type classified as .doc, .GIF, and .PDF, respectively. Contents table 432 comprises any content that describes or supports a product, category, or subject, with the actual content located in content values table 424. Thus, content table 432 defines a placeholder for the content but does not actually store the content.

In some implementations (e.g., Oracle 8.0), this technique improves the speed of searching and retrieving data from the database. There should be a one-to-one relationship between contents table 432 and content values table 424. Content, for example, may include documents, images, lists, spreadsheets, drawings, manuals, video, or audio. Content properties such as name or description are represented in the relationship of content table 432 to attribute values table 402. Content is classified into the appropriate product, category, and/or subject categories by the relationship of contents table 432 to category contents table 404.

Content relationships table 408 describes the relationship among contents. For example, a document may be comprised of multiple pieces of content (i.e., chunked), which may include images or common paragraphs shared by other documents. Content relationship types table 416 defines how or why content is related to another piece of content. For example, content may be converted from existing content (e.g., text document converted to HTML). This type may be defined as converted. Another example would be a logo that is associated with several pieces of content (e.g., HP logo used in various documents). This type may be defined as chunked.

Category contents table 404 maps a piece of content to its proper location or locations in the category (e.g., product or subject) index and defines relationships between categories and content. For example, a document that describes how to ensure that a telephone line is properly inserted into a facsimile machine may be located in various product hierarchy locations such as shown below (see also description in reference to FIG. 3c. for an exemplary hierarchical relationship).

| Fax product | or | Fax product |
|---|---|---|
| -troubleshooting | | -install and |
| configure | | |
| -faxing | | -connecting |
| telephone line. | | |
| -sending | | |
| -no dial tone; | | |

Parameter names table 418 defines the name of a parameter based on a specified parameter type and may also be defined for a specified language. Application parameter types table 426 is used to group parameter types such as hypertext markup language (HTML) errors, HTML constants, and system constants. Parameter values table 410 defines a value for the parameter that is named by parameter names table 418. Examples of parameter names and values are shown below.

| Name | Value |
|---|---|
| CDS-0001 | Web page not found |
| CDS-0002 | SQL error |
| Time-out value | 45 minutes |

Application areas table 440 is used to define areas (e.g., content, categories, templates, or template methods) of an application utilizing database model 400 that may be referenced by database model 400. Attributes table 442 describes the attributes, within the limits set forth in application areas table 440, that can be defined for an application utilizing database model 400. For example, attributes may include access control lists, display, language, release date, and author. Attribute areas table 434 defines the area of an application utilizing database model 400 that is allowed to use each attribute. For example, a language attribute would apply to areas including content, categories, and templates, while an operating system attribute would apply only to the content area. Attribute pre-defined value table 428 holds all pre-defined enumerated values for a specified attribute, because an attribute or attribute area may have one or more values pre-defined in an enumerated list.

Attribute values table 402 contains values assigned to the attributes specified for the related tables via a foreign key. A value is assigned to the attribute and specified as either a category, category type, content, content type, category content, parameter name, or template. The value may come from a pre-defined list (i.e., attribute pre-defined value table 428) or be user defined (one of the value attributes). Various database rules may be required regarding attribute values (e.g., see Computer Program Listing Appendix B).

The content for database model 400 may be displayed using templates to construct the web pages. In general, the templates are generated and represent the intended layout of a desired page type. After the layout has been drafted using and HTML authoring tool, the dynamic content of the page is identified and substituted by CDS specific tags which allow access to the database and provide control mechanisms. When a page is generated, the HTML generator finds these specific tags and replaces them with content from the database. Computer Program Listing Appendix G provides further details of the dynamic HTML template interpreter.

Template types table 420 defines a category for a presentation template. Examples of template types are content template, category template, standard error template, and navigation template. Templates table 412 defines the template (i.e., name of the template and the template source) that is used to define how content and product/subject categories are presented. For example, when a product category/index or a product content (e.g., documents) is presented on the World Wide Web (WWW), a template is used to define how this information is formatted for presentation and may also be used to define what information is presented.

Presentation methods table 406 defines the template(s) used to display a piece of content or category. A piece of content or category may have many templates defined for it, but based on pre-defined criteria, only one of the templates will be used to present the content or category. Attributes associated with the presentation method are used to resolve the ambiguity as to what template to use when presenting a content or a category that has two or more templates. For example, a support document for changing a toner cartridge may be presented a certain way for commercial users and in a different way for home users. Therefore, a presentation template must be associated to the content for each presentation method. The presentation method used for a template (e.g., commercial or home user) can be determined by the relationship of the presentation methods table 406 to attribute values table 402. Presentation methods may have any number of pre-defined attributes associated with them.

Figure 5:
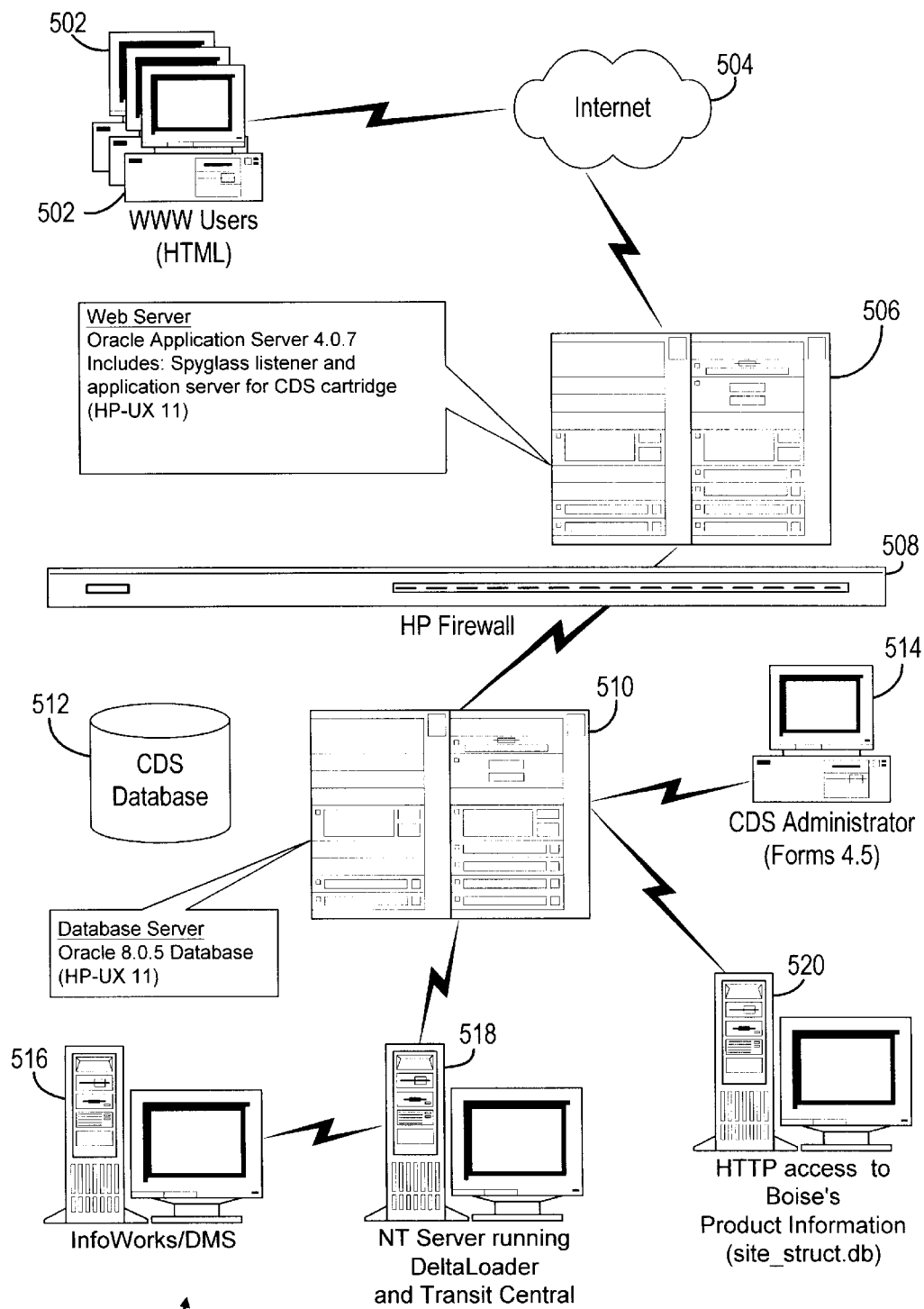
FIG. 5 is a system block diagram for an exemplary network application utilizing the database model of FIG. 4.

FIG. 5 is a block diagram of a computer system 500 for an exemplary network application utilizing the database model of FIG. 4. Computer system 500 comprises a plurality of user terminals 502 that access a web server 506 through a network 504, such as the Internet. A firewall 508 provides security and isolation through which web server 506 communicates with a database server 510. Database server 510 is connected to a database 512 utilizing database model 400. Database server 510 is also connected to one or more administrator terminals 514 and various other computers 516, 518, 520 that may comprise servers or computer systems that provide various services or information for database server 510.

A user may access various content or information by utilizing user terminal 502, which may include a desktop computer, a laptop computer, a personal digital assistant, or a telephone such as a cellular telephone with a display. For example, user terminal 502 may employ a web browser to communicate through network 504. Web server 506 comprises an HP-UX 11 operating system, an Oracle application server 4.0, an Oracle application server's spyglass listener for use as the web listener, and Net 8 for communication with database 512. The Oracle application server is responsible for spawning off server applications to support the Internet publishing architecture application, such as an HTML template interpreter that communicates with database 512 using Net 8. The template interpreter is a cartridge of the Oracle application server and is responsible for preparing and presenting content to users, typically by the use of templates, as described in greater detail below in reference to FIG. 6. Also, note that the names Oracle and HP, along with various related products listed herein, are registered Trademarks of Oracle Corporation of Redwood Shores, Calif., and Hewlett Packard of Palo Alto, Calif., respectively.

Database server 510 hosts an HP-UX 11 operating system, an Oracle 8.0.5 database management system, and Net 8.0 for communication with server 506 (e.g., Web Server and Oracle Application Server) through firewall 508. One or more administrator terminals 514 allow for the maintenance of the product and navigation information along with other components of computer system 500. Computer 516 provides new or updated content and computer 518 uses an application such as DeltaLoader to extract the content from computer 516 and load the information into database 512 through database server 510. Computer system 500 may also use one or more remote terminals such as computer 520 to provide required product information such as product name, series, family, and ID. For more detailed information for computer system 500, such as multi-language support, please refer to Computer Program Listing Appendix A.

Figure 6:
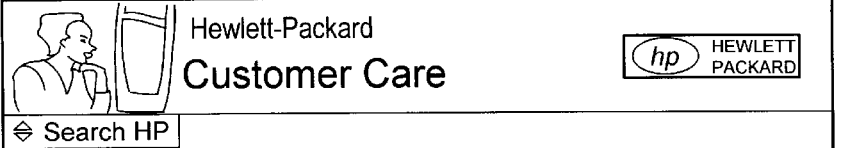
FIG. 6 is an exemplary template for displaying content by utilizing the database model of FIG. 4.

Data maintained in database 512 includes templates, structured data, and unstructured data. In general, a template will be required to display data (e.g., structured or unstructured) to a user. FIG. 6 is an exemplary template 600 for displaying content by utilizing the database model of FIG. 4. Template 600 illustrates the principle of nesting templates within templates so that templates can be designed with modularity and re-use in mind.

Template 600 comprises a top banner template 602, a navigation template 604, a bottom banner template 606, along with content 608. Top banner template. 602 displays top banner content including the HP logo. Navigation template 604 displays navigation content, while bottom banner template 606 displays bottom banner content. Content 608 displays the content for template 600, which in this case is an exemplary support document on print quality troubleshooting. For example, the exemplary Internet publishing architecture, utilizing computer system 500 and the data and table structure of database model 400, may serve all content and navigation pages dynamically through the use of templates to provide web pages with the requested content to a user through the network. The requests may also be directed to static/dynamic HTML pages or to images or other multimedia items such as portable document format (PDF) files. The process of generating a web page using a template is described in detail in Computer Program Listing Appendix G.

Figure 7:
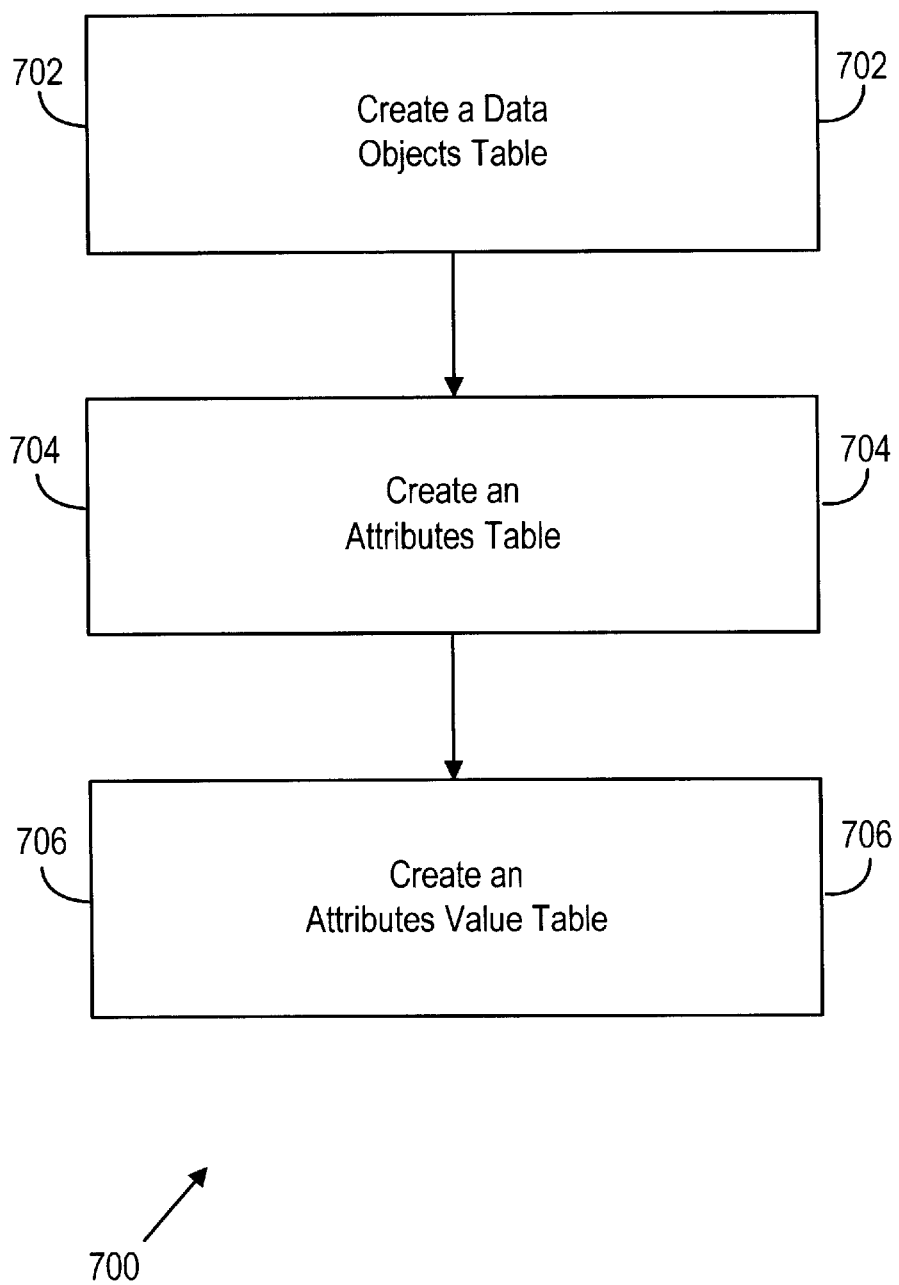
FIG. 7 is a flowchart for an exemplary data model table structure, in accordance with some embodiments of the present invention.

FIG. 7 is a flowchart 700 for an exemplary data model table structure, in accordance with some embodiments of the present invention. Flowchart 700 provides the basic steps for creating a database model that provides a basic, generic structure of exemplary table structure 200 of FIG. 2a. Step 702 creates a data objects table that includes attributes that generally are unlikely to be changed and specific instances of these attributes. Step 704 creates an attributes table that includes properties regarding attributes in the data objects table of step 702. Step 706 creates an attributes value table that includes the actual values of the properties for the specified attributes corresponding to certain specific instances of the attributes. Therefore, flowchart 700 provides a generic, flexible, and expandable database model applicable to many types of database applications.

Figure 8:
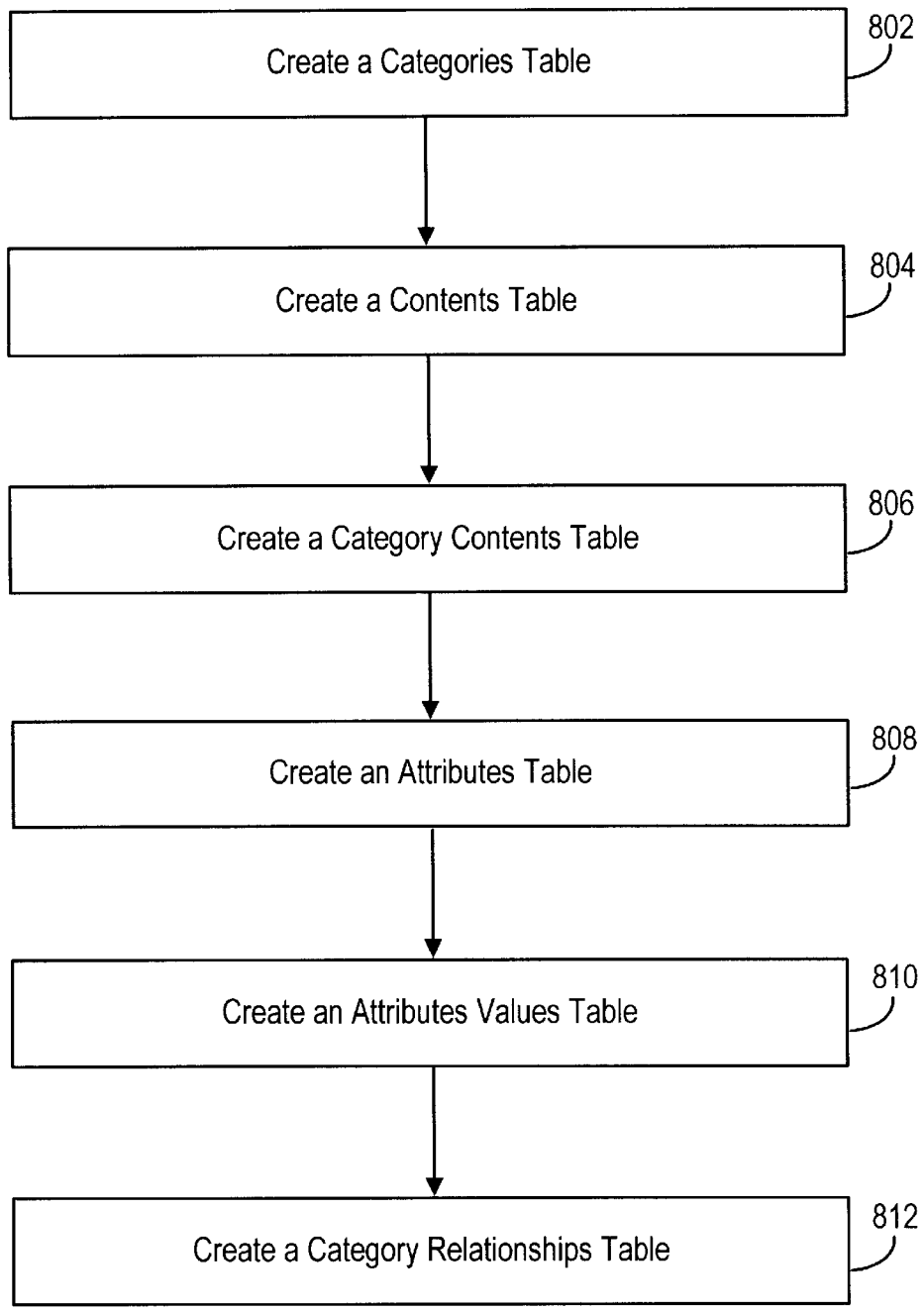
FIG. 8 is a flowchart for an exemplary data model table structure, in accordance with some embodiments of the present invention.

FIG. 8 is a flowchart 800 for an exemplary data model table structure, in accordance with some embodiments of the present invention. Flowchart 800 provides the basic steps for creating a database model that provides a basic, generic structure of exemplary table structure 300 of FIG. 3*a*. Step 802 creates a categories table that includes categories for the subject matter of the database. Step 804 creates a contents table that contains any content necessary to describe or support a category in the categories table of step 802. Step 806 creates a category contents table that provides a mapping scheme that maps a portion of content from the contents table of step 804 to its place in the category index corresponding to the categories table of step 802. Step 808 creates an attributes table that includes all attributes defined for the database. Step 810 creates an attributes values table that includes values assigned to an attribute specified through one of the related tables of flowchart 800. Step 812 creates a category relationships table 812, which may be optional, that describes how categories relate to each other along with corresponding relationship rules. Therefore, flowchart 800 provides a generic, flexible, and expandable database model applicable to many types of database applications.

It should be understood from the description herein that the database model system and method in accordance with an embodiment of the present invention provides many advantages over traditional database modeling schemes. The database model system and method, for example, provides flexibility and the ability to change or modify aspects of the data model by the modification of data rather than through fundamental data model schema changes. The database model may be incorporated into a computer system, for example, to deliver web pages to users on the computer network (e.g., WWW users on the Internet). For example, these web pages may be product pages, navigation pages, or pages with support documents, with requests made by users via a uniform resource locator (URL) using a hypertext transfer protocol (HTTP). This is but one example of the use of the database model and does not limit the application scope as the database model is useful for any type of database modeling and has application identical to or beyond that of the traditional data model.

Embodiments described above illustrate but do not limit the invention. It should also be understood that numerous modifications and variations are possible in accordance with the principles of the present invention. For example, while categories of HP products were illustrated in an exemplary embodiment, the present invention is not limited to this type of embodiment and it should be understood that any type of data may be modeled. Accordingly, the scope of the invention is defined only by the following claims.

I claim:

1. A method of structuring a computer database that is stored on a computer readable medium, said method comprising: providing a category table including categories for subject matter of the database;

providing a content table containing content corresponding to categories in said category table;

providing a category contents table containing a mapping scheme that maps content contained in said content table to categories in said category table;

providing an attributes table containing attributes for an application utilizing said database; and providing an attributes values table containing values corresponding to said attributes in said attributes table, wherein a category for the subject matter can be changed by changing a row in the category table and a content corresponding to a category can be changed by changing a row in the content table, wherein a row in the attribute values table is modified based upon the changes in the rows in the category table and content table, in order to modify an attribute value.

2. The method of claim 1, further comprising providing a category relationships table containing category relationships and rules corresponding to categories in said category table.

3. The method of claim 1, further comprising:

providing an attribute area table that defines the area of an application utilizing said database which is permitted to use certain of said attributes; and providing an application area table that defines the areas of an application utilizing said database which may be referenced.

4. The method of claim 1, further comprising:

providing an attribute pre-defined value table that contains all pre-defined enumerated values for certain of said attributes; and providing a category pre-defined values table that contains pre-defined values for certain categories in said category table.

5. The method of claim 1, further comprising:

providing a category types table that describes the category type for certain categories in said category table; and providing a content type table that describes the type of content stored in said content table; and providing a category relationship rule table that describes the relationship rules for said category types.

6. The method of claim 1, further comprising providing a content value table that contains the actual content corresponding to said content in said content table.

7. The method of claim 1, further comprising:

providing a content relationships table that describes the relationship among said content in said content table; and providing a content relationship type table that defines the rationale for the relationship among said content in said content table.

8. The method of claim 1, further comprising:

providing a parameter names table that defines names of parameters;

providing an application parameter type table that groups parameter types; and providing a parameter value table that defines values for said parameters in said parameter names table.

9. The method of claim 1, further comprising:

providing a template table that provides templates that are used to present categories and said content;

providing a template types table that defines types of templates; and providing a presentation method table that identifies which of said templates are used to display said categories and said content.

10. A computer system for storing and transferring data, the system comprising:

at least one server computer connected through a computer network; and at least one computer program executed by said at least one server computer, wherein said at least one computer program manages data stored in a database having a structure comprising:

a category table including categories for subject matter of the database;

a content table containing content corresponding to categories in said category table;

a category contents table containing a mapping scheme that maps content contained in said content table to categories in said category table;

an attributes table containing attributes for an application utilizing said database; and an attributes values table containing values corresponding to said attributes in said attributes table, wherein a category for the subject matter can be changed by changing a row in the category table and a content corresponding to a category can be changed by changing a row in the content table, wherein a row in the attribute values table is modified based upon the changes in the rows in the category table and content table, in order to modify an attribute value.

11. The system of claim 10, wherein said database structure further comprises a category relationships table containing category relationships and rules corresponding to categories in said category table.

12. The system of claim 10, wherein said database structure further comprises:

an attribute area table that defines the area of an application utilizing said database which is permitted to use certain of said attributes; and an application area table that defines the areas of an application utilizing said database which may be referenced.

13. The system of claim 10, wherein said database structure further comprises:

an attribute pre-defined value table that contains all pre-defined enumerated values for certain of said attributes; and a category pre-defined values table that contains pre-defined values for certain categories in said category table.

14. The system of claim 10, wherein said database structure further comprises:

a category types table that describes the category type for certain categories in said category table; and a content type table that describes the type of content stored in said content table; and a category relationship rule table that describes the relationship rules for said category types.

15. The system of claim 10, wherein said database structure further comprises providing a content value table that contains the actual content corresponding to said content in said content table.

16. The system of claim 10, wherein said database structure further comprises:

a content relationships table that describes the relationship among said content in said content table; and a content relationship type table that defines the rationale for the relationship among said content in said content table.

17. The system of claim 10, wherein said database structure further comprises:

a parameter names table that defines names of parameters;

an application parameter type table that groups parameter types; and a parameter value table that defines values for said parameters in said parameter names table.

18. The system of claim 10, wherein said database structure further comprises:

a template table that provides templates that are used to present categories and said content;

a template types table that defines types of templates; and a presentation method table that identifies which of said templates are used to display said categories and said content.

19. The system of claim 10, further comprising a web server computer to provide Internet access to said at least one server computer.

20. A method of structuring a computer database that is stored on a computer readable medium, said method comprising:

providing an entity table having a minimal set of attributes;

providing an entity attributes table having attributes corresponding to said entity table; and providing an entity attribute values table having values corresponding to said attributes, wherein an attribute can be changed by changing a row in the entity attributes table, wherein a row in the entity attribute values table is modified based upon the change in the row in the entity attribute table.

21. The method of claim 20, further comprising:

providing a content table containing content corresponding to said entity table; and providing an entity contents table that maps said content to a corresponding entity.

22. The method of claim 20, further comprising providing an entity relationships table that contains relationships and rules corresponding to entities in said entity table.

23. A computer system for storing and transferring data, said system comprising:

at least one server computer connected through a computer network; and at least one computer program executed by said at least one server computer, wherein said at least one computer program manages data stored in a database having a structure comprising:

A an entity table having a minimal set of attributes;

an entity attributes table having attributes corresponding to said entity table; and an entity attribute values table having values corresponding to said attributes, wherein an attribute can be changed by changing a row in the entity attributes table, wherein a row in the entity attribute values table is modified based upon the change in the row in the entity attribute table.

24. The system of claim 23, wherein said database further comprises:

a content table containing content corresponding to said entity table; and an entity contents table that maps said content to a corresponding entity.

25. The system of claim 23, wherein said database further comprises an entity relationships table that contains relationships and rules corresponding to entities in said entity table.

26. A method of structuring a database that is stored on a computer readable medium, said method comprising:

creating a data objects table containing attributes;

creating an attributes table containing properties of said attributes in said data objects table; and creating a value table containing values for said properties for specific instances of said attributes, wherein an attribute can be changed by changing a row in the attributes table, wherein a row in the value table is modified based upon the change in the row in the attributes table.

27. The method of claim 26, further comprising creating a relationships table containing object relationships corresponding to said attributes in said data objects table.

28. The method of claim 26, further comprising providing at least one foreign key in said value table to identify which value corresponds to a specific instance of said attributes for said properties.

29. A computer system for storing and transferring data, said system comprising:
- at least one server computer connected through a computer network; and
- at least one computer program, executed by said at least one server computer, wherein said at least one computer program manages data stored in a database having a structure comprising:
  - a data objects table containing attributes;
  - an attributes table containing properties of said attributes in said data objects table; and
  - a value table containing values for said properties for specific instances; of said attributes, wherein an attribute can be changed by changing a row in the attributes table, wherein a row in the value table is modified based upon the change in the row in the attributes table.

30. The system of claim 29, wherein said database structure further comprises a relationships table containing object relationships corresponding to said attributes in said data objects table.

31. The method of claim 29, wherein said database structure further comprises at least one foreign key in said value table to identify which value corresponds to a specific instance of said attributes for said properties.

32. The method of claim 1, wherein the modification to an attribute is permitted by changes to data in the database instead of changes to a structure of the database and definitions of the tables.

33. The method of claim 10, wherein the modification to an attribute is permitted by changes to data in the database instead of changes to a structure of the database and definitions of the tables.

* * * * *